(12) United States Patent
Sato et al.

(10) Patent No.: US 6,262,817 B1
(45) Date of Patent: *Jul. 17, 2001

(54) SYSTEM AND METHOD FOR ADJUSTING A COLOR IMAGE

(75) Inventors: Tsuneo Sato; Yoshihiro Nagata, both of Kanagawa (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/088,150

(22) Filed: Jun. 1, 1998

Related U.S. Application Data

(63) Continuation of application No. 08/607,267, filed on Feb. 20, 1996, now Pat. No. 5,930,009, which is a continuation of application No. 08/245,449, filed on May 18, 1994, now abandoned.

(30) Foreign Application Priority Data

May 21, 1993 (JP) .................................................. 5-119955

(51) Int. Cl.[7] ............................... G03F 3/08; H04N 1/46; G09G 5/00

(52) U.S. Cl. .......................... 358/518; 345/150; 345/153; 345/117

(58) Field of Search ..................................... 345/150, 153, 345/117; 382/205, 255, 27; 358/518

(56) References Cited

U.S. PATENT DOCUMENTS

| | | | |
|---|---|---|---|
| 5,012,333 | * 4/1991 | Lee et al. ................................ | 358/80 |
| 5,258,747 | * 11/1993 | Oda et al. ............................. | 345/153 |
| 5,333,070 | * 7/1994 | Ichikawa .............................. | 358/518 |
| 5,469,188 | * 11/1995 | Krishnamurthy et al. ........... | 345/117 |
| 5,930,009 | * 7/1999 | Sato et al. ............................ | 358/518 |

* cited by examiner

*Primary Examiner*—Richard Hjerpe
*Assistant Examiner*—Kevin M. Nguyen

(57) ABSTRACT

A color image system for adjusting colors of inputted images includes a color adjusting unit and color display unit. The color display unit simultaneously displays the original image, the adjusted image, and color information for both the original image and adjusted image. A color adjustment matrix is created by the color adjusting unit based upon color directions inputted to the color display unit with respect to the color information of the original color image. The color adjustment matrix is used to directly adjust the original image without converting the image to a second color space.

31 Claims, 24 Drawing Sheets

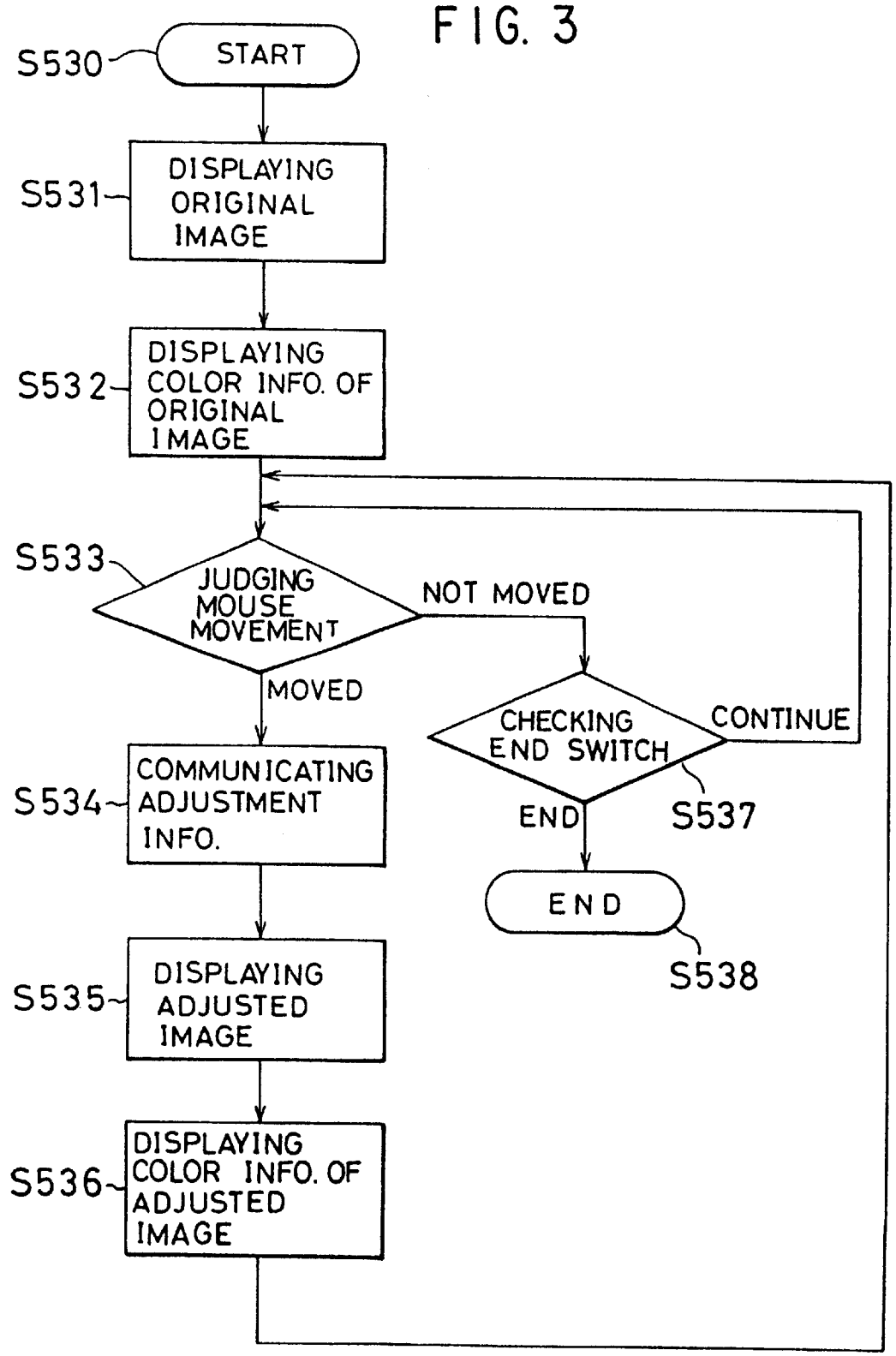

A = −32  BASE = 96
B = +32  LIGHTNESS = 160

FIG. 8A $$\begin{bmatrix} AR \\ AG \\ AB \end{bmatrix} = \begin{bmatrix} M11 & M12 & M13 \\ M21 & M22 & M23 \\ M31 & M32 & M33 \end{bmatrix} \begin{bmatrix} R \\ G \\ B \end{bmatrix}$$

ADJUSTED PIXEL —— SET UP MATRIX —— ORIGINAL PIXEL

FIG. 8B $$\begin{bmatrix} AR \\ AG \\ AB \end{bmatrix} = \begin{bmatrix} 1 & 0 & 0 \\ 0 & 1 & 0 \\ 0 & 0 & 1 \end{bmatrix} \begin{bmatrix} R \\ G \\ B \end{bmatrix}$$

ORIGINAL MATRIX

FIG. 8C $$= \begin{bmatrix} R + 0 + 0 \\ 0 + G + 0 \\ 0 + 0 + B \end{bmatrix} = \begin{bmatrix} R \\ G \\ B \end{bmatrix}$$

FIG. 8D

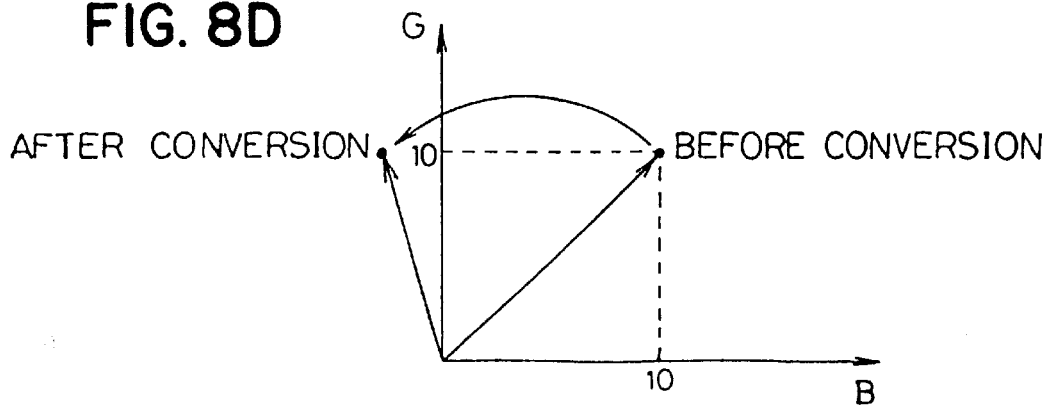

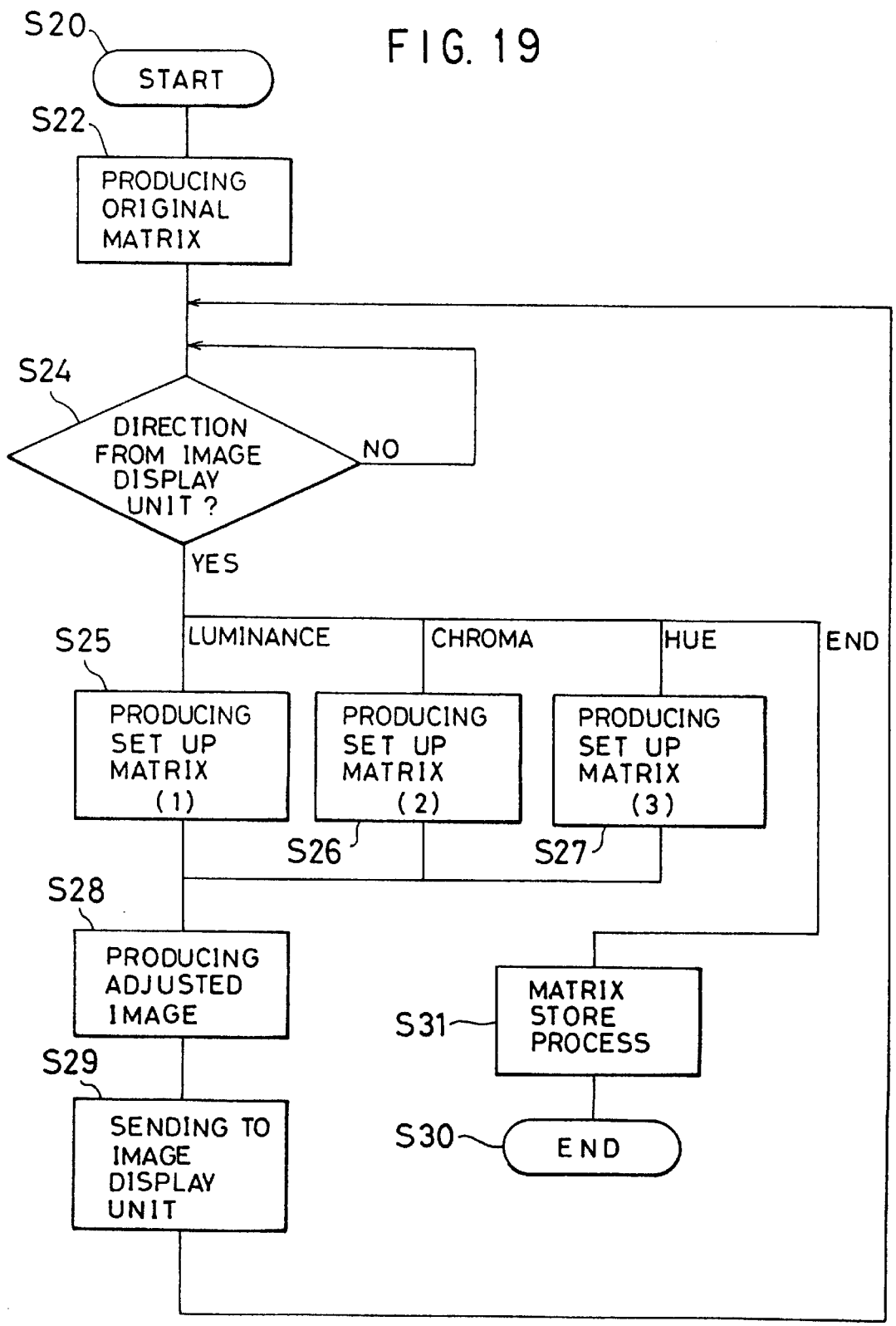

SYSTEM AND METHOD FOR ADJUSTING A COLOR IMAGE

This application is a continuation of application Ser. No. 08/607,267, filed Feb. 20, 1996, now U.S. Pat. No. 5,930,009, which in turn is an FWC of application Ser. No. 08/245,449, filed May 18, 1994 entitled SYSTEM AND METHOD FOR ADJUATING COLOR, and now abandoned.

BACKGROUND OF THE INVENTION

1. Field of the Invention

The present invention relates to a system for editing a color image displayed with electric signals and, in particular, to a color image system which exhibits improved color adjustment.

2. Description of the Related Art

Related Art 1.

FIG. 25 shows a block diagram of a conventional color correction apparatus disclosed in Unexamined Japanese Patent Publication 4-352569. In FIG. 25, a scanner 60 reads an image. A printer 80 forms the image. A conventional color correction apparatus 7 is composed of the following blocks. A color correction unit 71 performs a color correction. An initial parameter memory 72 stores initial parameters for adjusting an initial color correction level. A data input unit 73 sets up the contents of the initial parameter memory 72. A correction parameter memory 74 stores correction parameters for adjusting a color correction level. A fuzzy inference unit 75 infers the correction parameters from operation of a user. An operation unit 76 inputs a direction of the user.

FIG. 26 is a block diagram showing the internal configuration of the color correction unit 71 shown in FIG. 25. In FIG. 26, a color correction table memory 711 stores and corrects a conversion table which corrects data of an input image. A color range detector 712 judges whether or not the color of the image is within a color range to be corrected. A selector 713 selects an output depending upon a result of the judging operation performed by the color range detector 712. A color converter 714 converts a signal of the scanner 60 into a signal of the printer 80. An input level correction unit 715 corrects the level of an input signal. An output level correction unit 716 corrects the level of an output signal.

The operation of the conventional color correction apparatus will now be described. When there is no color correction request by the user, the color correction apparatus 7 is in the color correction state set up by the initial parameters for the color correction. The data input unit 73 calculates initial parameters for the color correction from the color correction level specified in advance and stores the initial parameters in the initial parameter memory 72. The initial parameter memory 72 sets the color correction level calculated by the initial parameter, in the color correction unit 71. The initial parameter memory 72 sets the color correction table H (L, H, S) in the color correction table memory 711 (L stands for lightness, H for hue, S for saturation, hereinafter). The initial parameter memory 72 sets a desired color range Si for the color correction, in the color range detector 712. The initial parameter memory 72 sets various conversion matrixes Mi and functions fi for converting the signal of the scanner 60 to the signal of the printer 80, in the color converter 714.

When the image is input by the scanner 60 in this state, the input signal is provided to the color correction table memory 711, color range detector 712 and the selector 713, in the color correction unit 71. The input signal is decoded to an address using a value of coordinate transformed (L, H, S), and the color correction table memory is read by the decoded address. A signal of the color corrected data is sent to the selector 713.

The color range detector 712 judges whether the input signal is within the desired color range Si for color correction or not. A result of the judging is output to the selector 713. The selector 713 outputs the color corrected signal or the input signal to the color converter 714 depending upon the judging result. The color converter 714 converts the corrected signal or the input signal to a gray scale signal of the printer 80 using the matrix Mi and the function fi, then outputs the converted signal to the printer 80. An image is formed by performing the above procedure on the input signals.

The case of a color correction request by a user being input from the operation unit 76 will now be described. The fuzzy inference unit 75 analyzes and infers the color correction request to obtain color correction parameters, the color correction table H (L, H, S), the desired color range Si for color correction, the conversion matrix Mi and the function fi, then stores the obtained data in the correction parameter memory 74. The correction parameter memory 74 receives the color correction table H (L, H, S), the desired color range Si for color correction, the conversion matrix Mi and the function fi, and sets the received data in the color correction table memory 711, the color range detector 712 and the color converter 714. The image is formed by processing the input signals in the same way as the above.

Related Art 2.

FIGS. 27 to 29 show dialogue boxes in the user guide (pages 158–160) of Photoshop by Adobe Co. (Photoshop is a registered trademark of Adobe Co.).

FIG. 27 shows a dialogue box for adjusting a threshold level for displaying a gray-scale image in black and white. It is possible to set up a border between black and white of the gray-scale image as the threshold level, by moving a mouse pointer right and left with a cursor.

FIG. 28 shows a dialogue box for changing the brightness and contrast. It is possible to change the brightness and contrast by moving the mouse pointer right and left.

FIG. 29 shows a dialogue box for adjusting the brightness and contrast. It is possible for the dialogue box of FIG. 29 to both designate and adjust Red, Green and Blue separately and to adjust Red, Green and Blue together simultaneously as a master mode. The minimum luminance of the image can be adjusted by moving the mouse pointer of shadows. The maximum luminance can be adjusted by moving the mouse pointer of highlights. In addition, the luminance of an intermediate color can be changed by moving the mouse pointer of $\gamma$ (gamma) without changing the maximum luminance and the minimum luminance.

Histograms are shown on the dialogue boxes of FIGS. 27 and 29. The horizontal axis of the histogram shows brightness value and the vertical axis shows the number of pixels. These histograms are displayed in black and white. The system of Photoshop adjusts an original image directly using the dialogue box. Namely, when a color adjustment of the original image is specified by the dialogue box, the original image itself is adjusted based on the adjustment specification. Since only the adjusted image is displayed, it is impossible to compare the original image and the adjusted image.

Related Art 3.

FIG. 30 shows a procedure of color adjustment shown in pages 249 to 252 of the thesis "Japan Hard Copy" 89 (NIP-30, Kanamori, Kawakami, Odera) entitled "A color adjustment selection of a color image by supplying lattice points in a color space". A dense space 81 is converted to a color space of RGB. The color space of RGB is converted to an L*a*b* space via XYZ color space. An adjustment amount is specified by using the L*a*b* space. After the adjustment, values are reconverted to return to the dense space via the XYZ space and the RGB space.

In a conventional color adjustment, the color space for specifying the color adjustment is sometimes changed from the color space forming an image data so that the color adjustment should match with the human recognition. In this case, the color space of the image data is converted to the color space for specifying the adjustment amount, and then the converted data is inversely converted to the color space of the image data.

Problems to Be Solved By the Invention

In the color correction unit of the conventional color image system stated in Related Art 1, it is necessary to express an instruction in an accurate and suitable expressions when the color correction or adjustment is needed. For instance, an instruction such as, "change the rather dark part to be a little brighter" must be entered from the operation unit. In addition, it is difficult to adjust accurately since the directive words are limited. It is also necessary to give a plurality of directions when plural colors need to be adjusted. The color correction unit in the conventional color image system has problems in the method of adjusting and directions such as discussed above.

Since there is no function of displaying how the color has been changed in adjusting, users have to adjust the color by just watching the last image output, so that there are problems in terms of time and cost.

Regarding software for adjusting the color image of Related Art 2, a histogram is displayed for adjusting the image and it is possible to change the threshold level and the contrast by using the mouse. However, the directions of the adjustment are performed separately at different dialogue boxes. Accordingly, it is not easy to know the adjustment as a whole. In addition, since all the information of the dialogue box is displayed in black and white, it is necessary for the user to imagine the change in making adjustments. Since neither images before and after the adjustment nor color information before and after the adjustment is displayed, it is impossible to compare the change before and after the adjustment.

Regarding a color adjustment procedure of Related Art 3, each pixel is converted from the color space of image data to the color space for specifying the adjustment amount when the color spaces differ. Then, an inverse conversion of the color space for specifying the adjustment data to the color space of image data is performed after the color adjustment. Since the conversion and the inverse conversion are performed for each pixel, the amount of calculation becomes so enormous that the processing speed of the color adjustment becomes very slow.

An object of the present invention is to provide a system for a color image wherein the direction of the color adjustment is set to correspond to the displayed color information, so that the color information corresponds with the image clearly.

Another object of the present invention is to provide a system for the color image wherein the operation of changing the color can be performed easily and efficiently.

Another object of the present invention is to provide a method of color adjusting of the color image system.

Another object of the present invention is to provide a color image system wherein it is possible to calculate image data of the adjusted image from the image data directly by using a color adjustment matrix without converting the color space of the image data when the color space of the image data differs from the color space for specifying the adjustment amount.

Another object of the present invention is to provide a method for color adjusting of the color image system.

SUMMARY OF THE INVENTION

A color image system according to one aspect of the present invention includes:
(a) image display means for displaying the original image and the adjusted image,
(b) color information display means for analyzing the original image, producing color information, and displaying the color information,
(c) adjustment direction means for giving a direction of a color adjustment with reference to the color information displayed by the color information display means, and
(d) adjustment means for producing the adjusted image based on the direction given by the adjustment direction means so that the image display means displays the adjusted image.

According to one aspect of the color image system of the present invention, the color information display means analyzes color information of the adjusted image and displays the analyzed color information.

According to one aspect of the color image system of the present invention, the adjustment means comprises matrix production means for producing a color adjustment matrix depending upon color adjustment amount directed by the adjustment direction means, and adjusted image production means for producing the adjusted image from the original image based on the color adjustment matrix produced by the matrix production means.

The color image system according to one aspect of the present invention comprises storage means for storing the color adjustment matrix produced by the matrix production means.

According to one aspect of the color image system of the present invention, the color information display means analyzes the original image per color attribute, which is luminance, chroma, hue and such, and displays a distribution map for each attribute as color information.

According to one aspect of the color image system of the present invention, the distribution map is produced with a mixed form of a plurality of attributes.

According to one aspect of the color image system of the present invention, a pointer for specifying adjustment amount depending upon the color information displayed by the adjustment direction means is comprised, an attribute to be adjusted is selected by moving direction of the pointer, and an adjustment amount of the selected attribute is indicated by a moving amount of the pointer in the case of the color information being produced by mixing distributions of a plurality of attributes.

According to one aspect of the color image system of the present invention, the color information display means displays color information regarding a plurality of attributes simultaneously, the adjustment direction means gives directions for the plural attributes and the matrix production means produces one color adjustment matrix for adjustment directions concerning the plural attributes.

A color image system according to one aspect of the present invention includes:
(a) color information display for receiving an original image, analyzing the original image, producing color information and displaying the color information, (b) adjustment direction means for giving a direction of a color adjustment with reference to color information displayed by the color information display, (c) matrix production means for producing a color adjustment matrix depending upon directions of the adjustment direction means, and (d) output means for outputting the color adjustment matrix produced by the matrix production means.

According to one aspect of the color image system of the present invention, the original image is expressed by original coordinate data subject to a first color space, the color information display means converts the original coordinates data subject to the first color space to coordinates data subject to a second color space and produces color information from the converted coordinate data, the adjustment direction means indicates adjustment amount with the coordinate data subject to the second color space, the matrix production means produces a color adjustment matrix based on the coordinate data subject to the second color space, and the adjusted image is produced by calculating the produced adjustment matrix and the coordinate data based on the first space expressing the original image.

The color image system according to one aspect of the present invention includes peripheral equipment which works with a color adjustment matrix, wherein the matrix production means receives the color adjustment matrix from the peripheral equipment and revises the color adjustment matrix based on the direction of the adjustment direction means and the peripheral equipment works by using the new color adjustment matrix.

According to one aspect of the color image system of the present invention, a color space normalized with JIS can be used as a second color space for an adjustment direction and the matrix production means produces a matrix depending upon the second color space.

According to one aspect of the color image system of the present invention, the matrix production means produces a color adjustment matrix using the adjustment amount regarding the chroma first, produces a color adjustment matrix using the adjustment amount regarding the hue secondly, then produces a color adjustment matrix using the adjustment amount regarding the luminance.

A color image adjusting method according to one aspect of the present invention comprises the steps of:

(a) displaying the original image, (b) analyzing the original image to produce color information and displaying the color information, (c) directing a color adjustment amount with reference to the color information, and (d) producing an adjusted image based on the adjustment amount and displaying the adjusted image on the image display unit.

The color image adjusting method according to one aspect of the present invention further comprises the steps of analyzing the adjusted image and displaying the analyzed color information.

A color image adjusting method according to one aspect of the present invention comprises the steps of:

(a) converting coordinate data subject to a first color space expressing the original image, to coordinate data subject to a second color space, calculating color information and displaying the color information, (b) directing color adjustment with reference to the color information displayed by the above step using the coordinate data subject to the second color space, (c) producing a color adjustment matrix for adjusting the original image based on the direction of the above step, and (d) producing an adjusted image based on the produced color adjustment matrix.

BRIEF EXPLANATION OF THE DRAWINGS

FIG. 3 illustrates operation of the image display unit according to the first embodiment of the present invention;

FIGS. 8A–8D (also referred to collectively as FIG. 8 and described herein as FIGS. 8(a)–8(d)) illustrate an adjusting logic of a color adjusting unit according to the first embodiment of the present invention;

FIG. 19 illustrates operation of a color information display area according to a fourth embodiment of the present invention;

DESCRIPTION OF THE PREFERRED EMBODIMENTS

Embodiment 1.

One Embodiment of the present invention will now be explained with reference a figure as follows.

Figure 1:
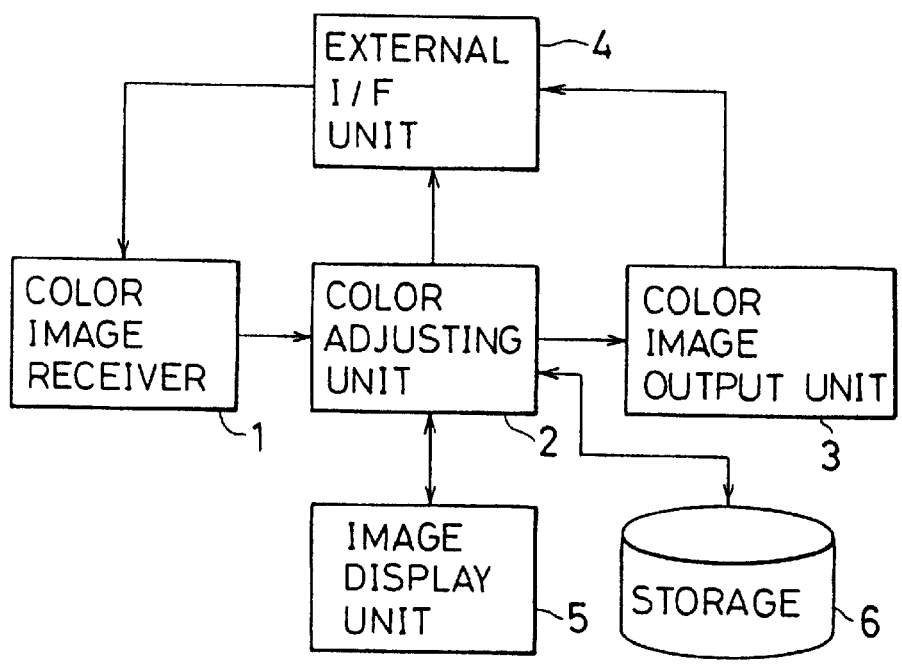
FIG. 1 shows a configuration of a color image system of the present invention.

FIG. 1 shows a configuration of a color image system of the present invention. A color image receiver 1, a color adjusting unit 2, a color image output unit 3, an external interface unit 4 and an image display unit 5 which is an interface between a display of an image and a user, are shown in FIG. 1.

A color image ("original image hereinafter") from an external storage apparatus such as a hard disk or from an image inputting apparatus such as a scanner, is input through the external interface unit 4.

The color image is converted into appropriate data at the color image receiver 1 and sent to the color adjusting unit 2. The color of the image is adjusted depending upon the designation from the image display unit 5 and the adjusted color image ("adjusted image" hereinafter) and a color adjustment matrix ("set up matrix" hereinafter) are produced at the color adjusting unit 2. The adjusted color image is converted into appropriate data suitable for an external apparatus, at the color image output unit 3 and sent to the external apparatus through the external interface unit 4. The color adjustment matrix is also sent to the external apparatus through the external interface unit 4.

Figure 22:
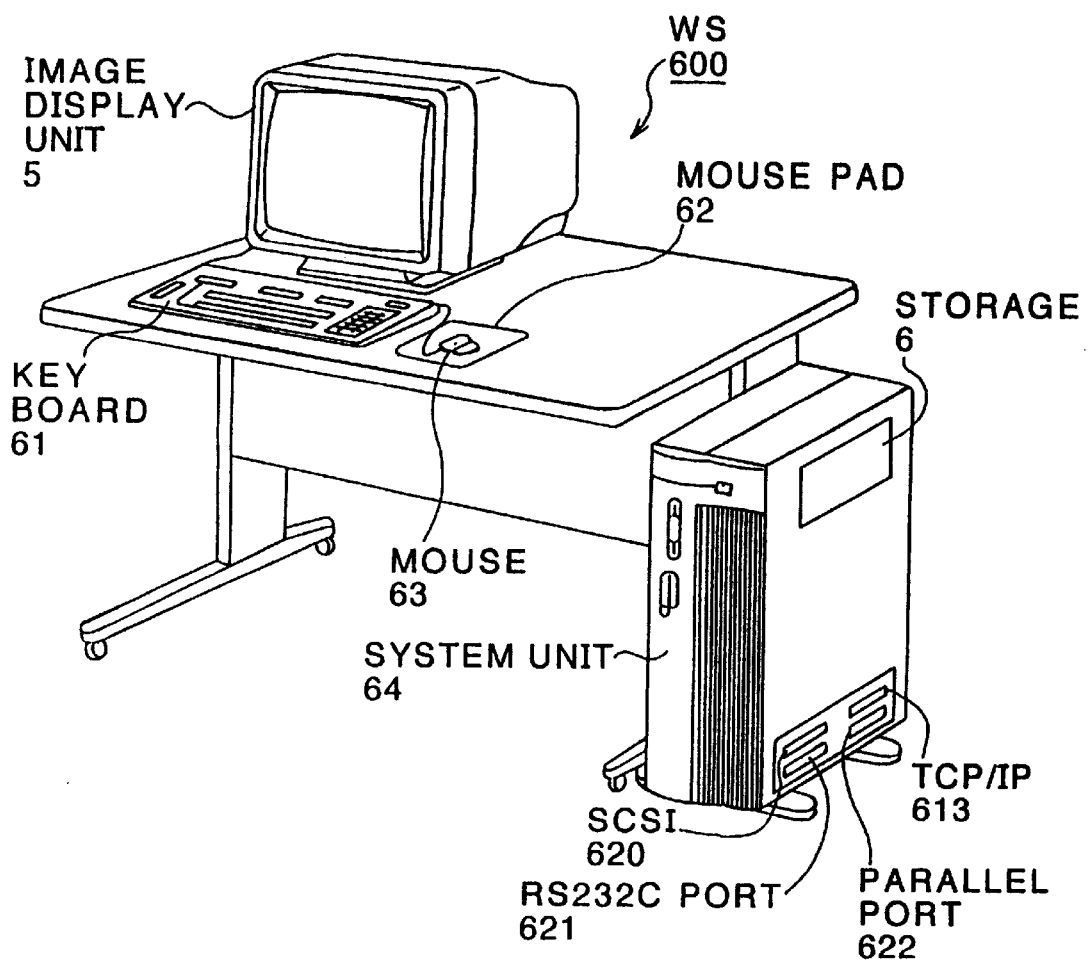
FIG. 22 illustrates a configuration of a system according to the present invention.

FIG. 22 is an illustration of a work station 600 as one example of the color image system. The image display unit 5 displays image data on a screen. A keyboard 61 is used to input letters and figures and a mouse 63 is used to point out a position on the display unit. A mouse pad 62 is also shown. The storage 6 is in a system unit 64. A TCP/IP 613 is an interface to a local area network. A SCSI 620, a RS232C port 621 and a parallel port 622 are also provided in the system unit 64.

Figure 23:
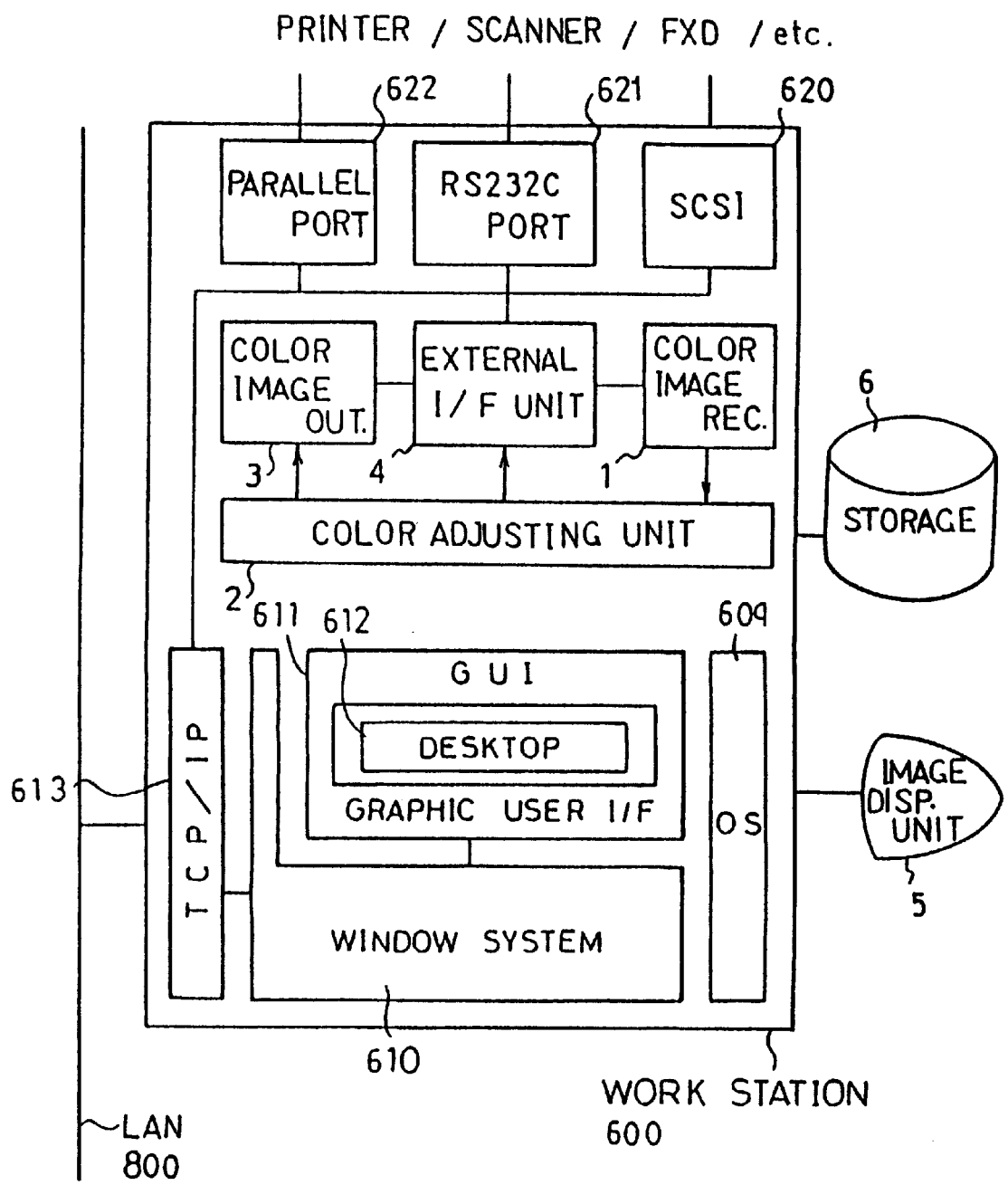
FIG. 23 is a system block diagram according to the present invention.

FIG. 23 is an internal block diagram. In FIG. 23, an operating system (OS) 609 controls the operation of the workstation. A window system 610 operates under the operating system. A graphic user interface (GUI) 611 operates under the window system. A desk top 612 operates on the graphic user interface and offers a desk top environment for the users. The SCSI 620, the RS232C port 621, the parallel port 622 and the TCP/IP 613 are connected to the external interface unit 4 so that the external interface unit 4 communicates with a scanner, a printer, an external storage apparatus, a LAN etc.

Figure 2:
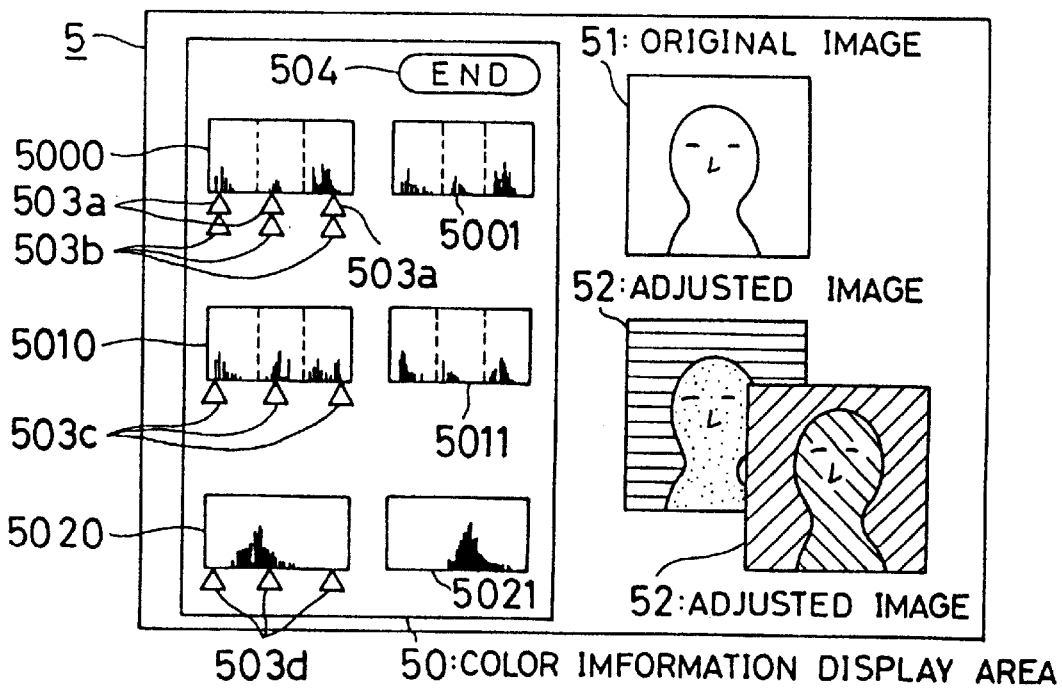
FIG. 2 shows an image display unit according to a first embodiment of the present invention.

FIG. 2 shows details of the image display unit 5. A color information display area 50, a window 51 for an original image, and a window 52 for the adjusted image are shown in the image display unit 5. A luminance information graph of the original image 5000, a luminance information graph of the adjusted image 5001, a chroma information graph of the original image 5010, a chroma information graph of the adjusted image 5011, a hue information graph of the original image 5020 and a hue information graph of the adjusted image 5021 are shown in the color information display area 50. A mouse pointer 503 (called 503 collectively, 503*a*, 503*b*, 503*c*, 503*d* separately) indicates the adjustment information to the color adjusting unit 2. An end switch 504 notifies end information to the color adjusting unit 2.

Now, the operation of the image display unit 5 will be explained with reference to FIG. 3. The operation starts from a "START" at step S530. The original image 51 is displayed at step S531. Color information of the original image (5000, 5010, 5020) is displayed at step S532. It is judged whether or not the mouse pointer 503 is moved, at step S533. In the case of the mouse pointer 503 being moved, adjustment information based on the movement amount of the mouse pointer 503 is sent to the color adjusting unit 2 and information on the adjusted image 52 is received from the color adjusting unit 2, at step S534. The adjusted image 52 is displayed at step S535. Color information (5001, 5011, 5021) on the adjusted image 52 is displayed at step S536. After this processing, the operation returns to step S533. In the case of the mouse pointer 503 being not moved, at step S533, the state of the end switch 504 is checked at step S537. When the end switch is on, the operation goes to "END" at step S538. In the case of continuing, the operation returns to step S533.

Details of the color information display area 50 and the operation of the mouse pointer 503 will be explained with reference to FIG. 4.

Figure 4A:
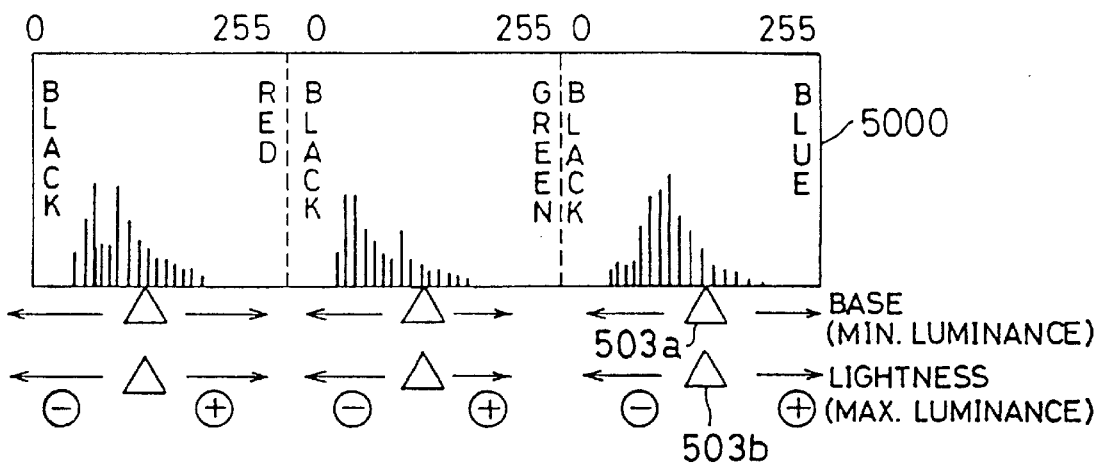
FIGS. 4A–C (also referred to collectively as FIG. 4 and described herein as FIGS. 4(a)–4(c)) illustrate a color information display area according to the first embodiment of the present invention.
Figure 4B:
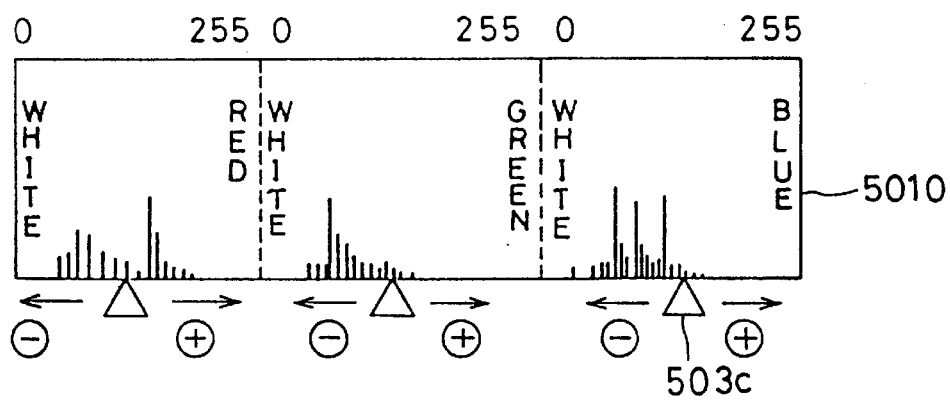

FIG. 4(*a*) shows the luminance information graph 5000. The graph is divided into three blocks and each block displays colors from black to the brightest additive primaries (red, green, blue). In FIG. 4(*a*), bars in each block make gradual color changing such as from black to red, black to green, and from black to blue with lining each bar colored in one color such as black, blackish red, weak red, pure red and so on depending upon the level of the luminance. In the case of luminance information of each pixel which constructs the original a image being stored by 1 byte (8 bits), the value of a luminance level is between 0 (zero) and 255, and the level has a distribution based on the value. A luminance distribution graph of each color component of the original image 51 is displayed in a color based on the luminance level. The luminance information graph 5001 of the adjusted image 52 is displayed in the same way as the above. Two mouse pointers 503*a* and 503*b* are equipped at each block, such that a total of six mouse pointers are equipped. Each mouse pointer 503 is separately or connectedly movable from left to right and vice versa to adjust a value of increasing and decreasing. The mouse pointer 503*a* adjusts a "base" which sets a minimum value of the luminance. The mouse pointer 503*b* adjusts a "lightness" which sets a maximum value of the luminance.

FIG. 4(*b*) shows the chroma information graph 5010. The chroma information graph is divided into three blocks. Each block displays colors from white to the highest chroma additive primaries (red, green, blue). In FIG. 4(*b*), bars in each block make gradual color changing such as from white to red, white to green, and from white to blue with lining each bar colored in one color such as white, whitish red, weak red, pure red and so on depending upon the level of the chroma. In the case of chroma information of each pixel which constructs the original image being stored by one byte (8 bits), value of the chroma information is between 0 (zero) and 255, and the chroma information has a distribution based on the value. A chroma distribution graph of each color component of the original image 51 is displayed in a color based on the chroma level. The chroma information graph 5011 of the adjusted image 52 is displayed in the same way as the above. A mouse pointer 503c is equipped at each block, so that a total of three mouse pointers are equipped. The mouse pointer 503c is separately or connectedly movable from left to right and vice versa to adjust a value of increasing and decreasing.

Figure 4C:
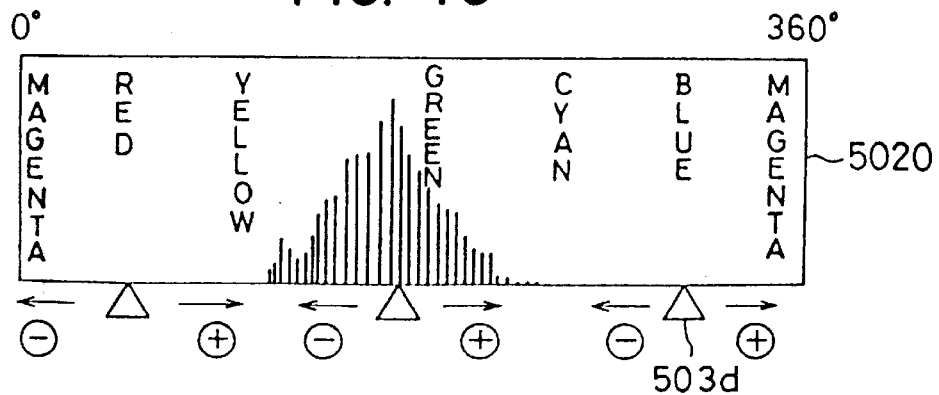

FIG. 4(c) shows the hue information graph 5020. The graph is displayed in a color corresponding to the hue. In FIG. 4(c), bars in a block make gradual color changing such as from magenta to red, red to yellow, yellow to green, from green to cyan and so on with lining each bar colored in one color such as magenta, magentish red, red, reddish yellow, yellow, yellowish green and so on depending upon the hue. Specifically, the graph is displayed in a highest chroma color based on the hue, that is magenta, red, yellow, green, cyan, blue and magenta again. . . . Angles from 0 to 360 degrees (0 to $2\pi$) are allotted to colors corresponding to the hue and the values corresponding to the angles are distributed. A bar graph (histogram) showing a hue distribution of each color component of the original image 51 is displayed in a color based on the hue. The hue information graph 5021 of the adjusted image 52 is displayed in the same way as the above. Three mouse pointers are equipped. Each mouse pointer 503d is separately or connectedly movable from left to right and vice versa to adjust a value of increasing and decreasing.

Now, an respect of displaying a histogram colored depending upon a signal level, which is applied for the luminance information graph 5000, the chroma information graph 5010 and the hue information graph 5020 will be described.

Figure 5A:
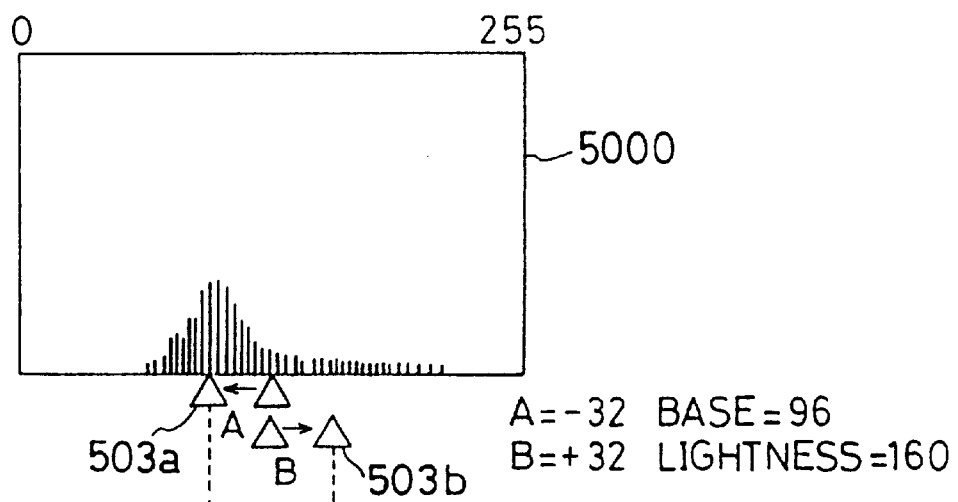
FIGS. 5A–5B (also referred to collectively as FIG. 5 and described herein as FIGS. 5(a) and 5(b)) illustrate operation of the color information display area of FIG. 4A.
Figure 5B:
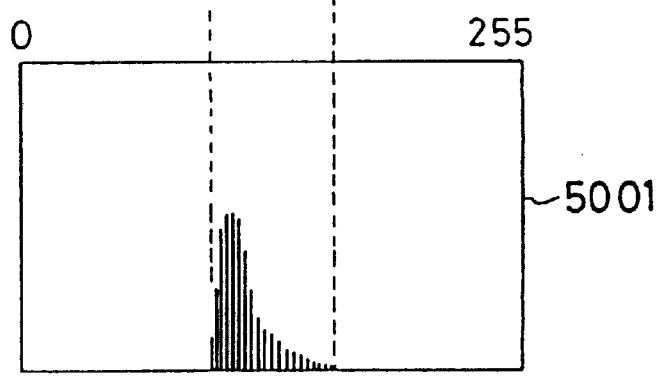

FIG. 5(a) shows a block of the luminance information graph 5000 of the original image and FIG. 5(b) shows a block of the luminance information graph 5001 of the adjusted image. By sliding the mouse pointer 503a indicating the base in the direction of arrow A and the mouse pointer 503b indicating the lightness in the direction of arrow B, it is possible to adjust the luminance information. The luminance information of the original image is adjusted to be within the range between the base and the lightness by designating the mouse pointers 503a and 503b. Accordingly, the adjusted image 52 whose luminance information distribution is within the range between the designated base and the designated lightness, is displayed. As shown in FIG. 5(b), the luminance information graph 5001 of the adjusted image 52, which is in the range between the base and the lightness, is produced.

Figure 6A:
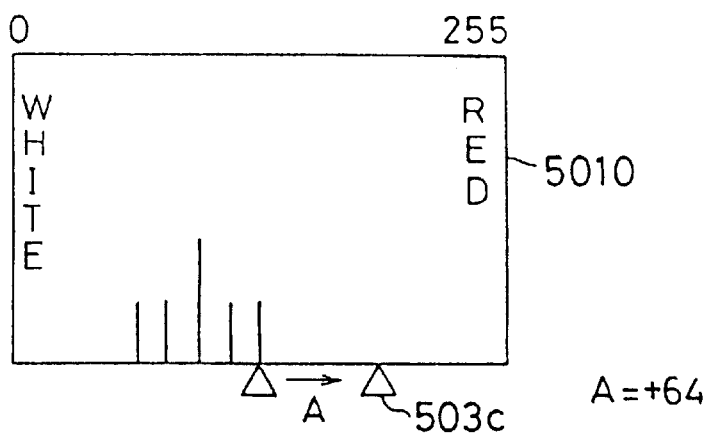
FIGS. 6A–6B (also referred to collectively as FIG. 6 and described herein as FIGS. 6(a) and 6(b)) illustrate operation of the color information display area of FIG. 4B.
Figure 6B:
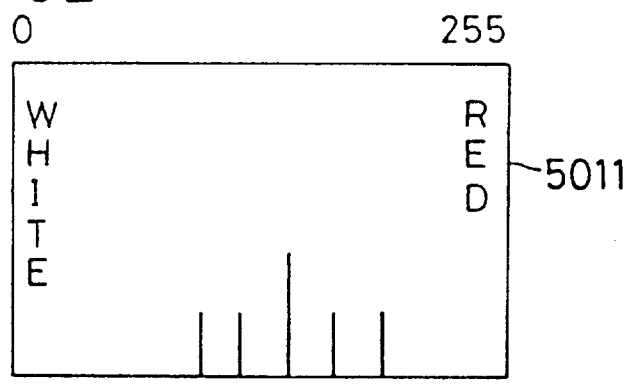

FIG. 6(a) shows a block of the chroma information graph 5010 of the original image and FIG. 6(b) shows a block of the chroma information graph 5011 of the adjusted image. It is possible to adjust the chroma by sliding the mouse pointer 503c in the direction of arrow A shown in FIG. 6(a). In this adjustment, the chroma is adjusted to be more red, so that the adjusted image 52 whose red becomes more bright is displayed. As shown in FIG. 6(b), the distribution of the chroma information graph 5011 of the adjusted image 52 is closer to red.

Figure 7:
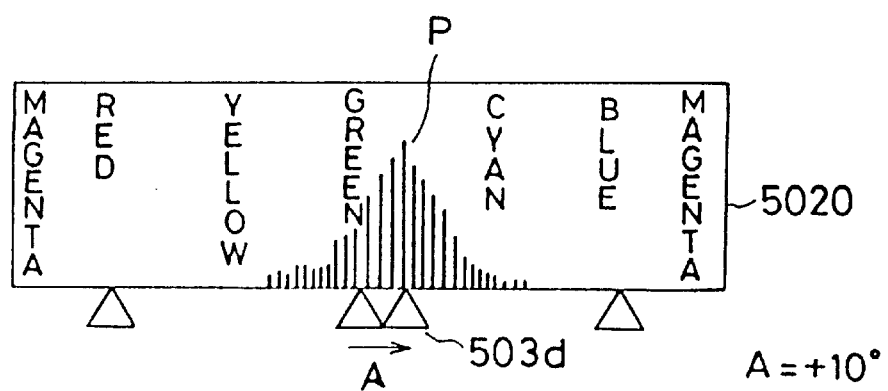
FIG. 7 illustrates operation of the color information display area of FIG. 4C.

Assuming that there is the original image 51 whose hue information graph 5020 has its peak near green as shown in FIG. 7. The center part of this hue information graph 5020 is displayed in green shade, the left bottom in yellowish green, the right bottom in bluish green. These colors change continuously. By sliding the center mouse pointer 503d in the direction of arrow A shown in FIG. 7, the peak P can be set at deep green. Then, the peak P of the distribution is displayed in deep green. In addition, the adjusted image 52 becomes an image which corresponds with the distribution of the hue information. The distribution of the hue information graph 5021 of the adjusted image 52 also changes, so that the peak of the distribution becomes deep green.

A principle of a color adjustment of the color adjusting unit 2 will now be explained with reference to FIG. 8. FIG. 8(a) shows a relation between an original pixel constructing the original image and an adjusted pixel constructing the adjusted image. Now, assuming that the original pixel and the adjusted pixel are expressed in an RGB space and, assuming that color information displayed in the image display unit 5 has attributes of luminance, chroma, hue. Thus, the color information is supposed to be expressed by using a color space differing from the color space used by the original pixel and the adjusted pixel. The set up matrix (or, called the color adjustment matrix) shown in FIG. 8(a) contains an adjustment direction based on the luminance, the chroma and the hue. The color adjusting unit 2 produces this set up matrix. By performing a matrix calculation of the produced set up matrix and values of the original pixel, the adjusted pixel can be calculated. A matrix which forms the set up matrix originally, is called an original matrix. As shown in FIG. 8(b), the original matrix is a diagonal matrix wherein only diagonal components exist. When data of the original pixel is calculated with the original matrix, the adjusted pixel becomes the same as the original pixel as shown in FIG. 8(c). The color adjusting unit 2 produces the set up matrix by adding the adjustment direction of the luminance, chroma, the hue, directed by the image display unit 5, for the original matrix. After the set up matrix being produced, the adjusted pixel can be produced by calculating the original pixel and the set up matrix.

Namely, if once the set up matrix has been produced, even when parameters, such as luminance, chroma, hue, based on different color spaces are input from the image display unit 5, it is possible to produce the adjusted pixel directly by performing a calculation using the set up matrix, for the values of the original pixel in RGB space. It is not needed to have the conventional process of converting data of the original pixel in the RGB space into data in color spaces of luminance, chroma, hue and adjusting the luminance, chroma, hue of the converted data, then putting the adjusted data of the luminance, chroma, hue back into the RGB space. Thus, on account of producing the set up matrix, this embodiment has an advantage that it is possible to produce a new adjusted pixel with using its own color space by only performing the matrix calculation, even parameters based on different color spaces are specified for adjusting the image.

Although it is possible to produce the adjusted image by producing the set up matrix even when the color space of the original pixel and a color space in which parameters are input are the same, the case that parameters are input by using a color space differing from the color space of the original pixel will now be explained.

The following two methods can be as a producing method of the set up matrix.
  (I) Method of describing the coordinate system before the conversion using the coordinate system after the conversion.
  (II) Method of describing the coordinate system after the conversion using the coordinate system before the conversion.

The set up matrix represents a relation between the coordinate before the conversion and that after the conversion. The method based on the coordinate before the conversion and the method based on the coordinate after the conversion, are two sides of the same thing. Producing the set up matrix by the method (I) of describing the coordinate system before the conversion using the coordinate system after the conversion will now be explained in reference with FIGS. 9 and 10. Producing the set up matrix by the method (II) of describing the coordinate system after the conversion using the coordinate system before the conversion will be explained later with reference to FIGS. 11, 12 and 13.

Figure 9:
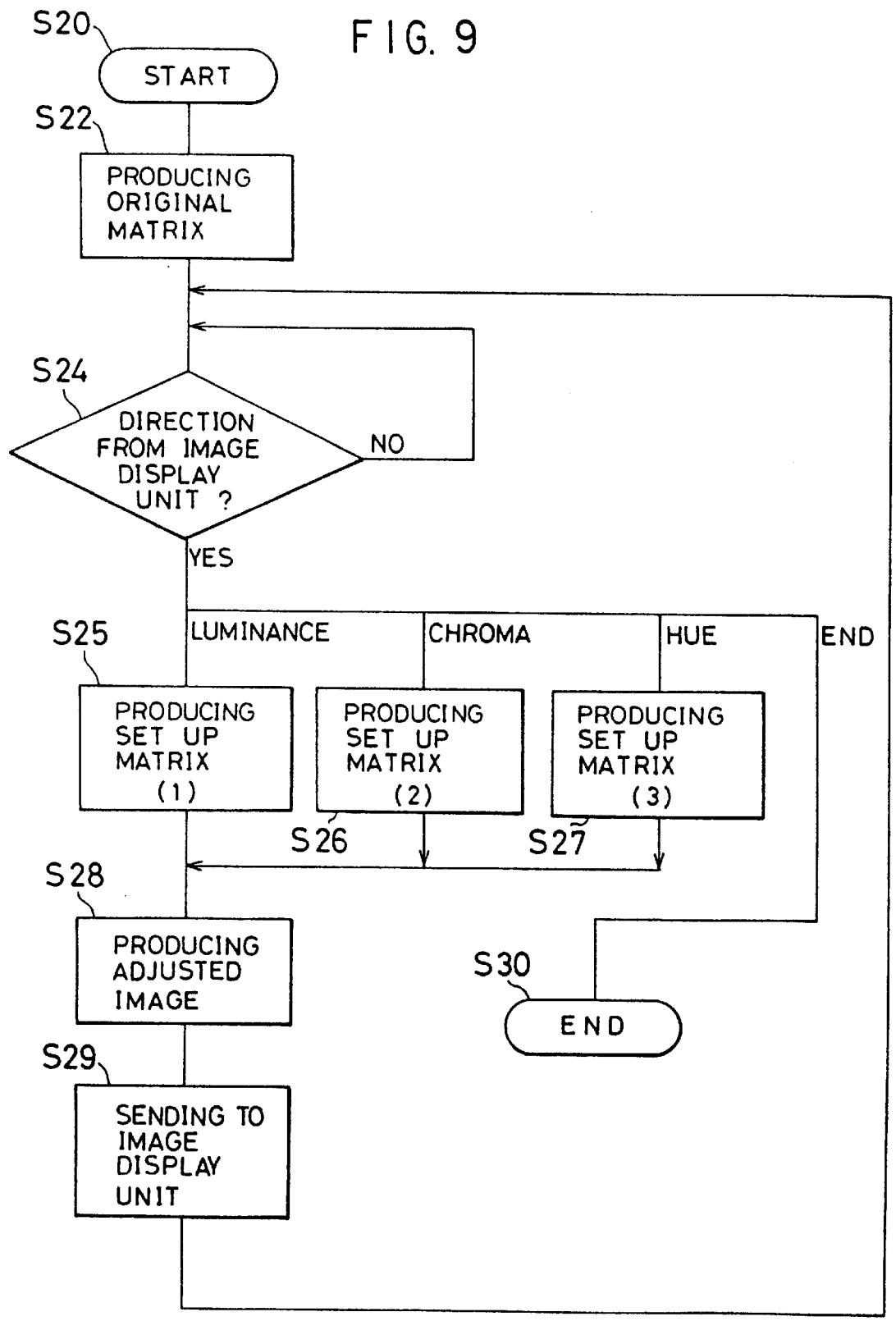
FIG. 9 illustrates operation of the color adjusting unit according to the first embodiment of the present invention.

The operation of the color adjusting unit 2 will be explained with reference to FIG. 9. A flowchart is used for the explanation of the processes performed in the color adjusting unit 2. The color adjusting unit 2 starts from "START" at step S20.

Then, the process goes to "PRODUCING ORIGINAL MATRIX" at step S22. The following is produced as the original matrix, for example.

$$\begin{bmatrix} M11 & M12 & M13 \\ M21 & M22 & M23 \\ M31 & M32 & M33 \end{bmatrix} = \begin{bmatrix} 1 & 0 & 0 \\ 0 & 1 & 0 \\ 0 & 0 & 1 \end{bmatrix} \quad [\text{Formula 1}]$$

The original matrix is described as follows for the explanation, hereinafter.

$$\begin{bmatrix} M11 & M12 & M13 \\ M21 & M22 & M23 \\ M31 & M32 & M33 \end{bmatrix} = \text{Original Matrix } M \quad [\text{Formula 2}]$$

A direction from the image display unit 5 is watched at step S24. Step S24 loops and no process is performed until the direction comes. The process is separated into four cases depending upon a direction when the direction from the image display unit 5 comes.

process (1): The case of the mouse pointers 503a, 503b of the luminance being moved process (2): The case of the mouse pointer 503c of the chroma being moved process (3): The case of the mouse pointer 503d of the hue being moved process (4): The case of the END switch 504 being turned on Each process of each case will be explained. Regarding the mouse pointer movement, the case of only one of the above (1), (2) and (3) being executed is explained to simplify the explanation. It is supposed that the adjustments of the luminance, chroma and hue are not directed simultaneously and each adjustment is directed respectively. Process (1): The case of the mouse pointers 503a, 503b of the luminance being moved—Step S25

As shown in FIG. 4, there are six a total of mouse pointers 503a and 503b at the bottom of the luminance information graph 5000. These mouse pointers 503a and 503b correspond to the maximum luminance or the minimum luminance of each color signal component.

More specifically, they are the six elements in a color signal expressed by RGB components: (1) the maximum luminance of R component (R max), (2) the minimum luminance of R component (R min), (3) the maximum luminance of G component (G max), (4) the minimum luminance of G component (G min), (5) the maximum luminance of B component (B max), and (6) the minimum luminance of B component (B min). When these mouse pointers are moved, information of the maximum luminance and the minimum luminance is sent to the color adjusting unit 2. A matrix is set up based on the information at the color adjusting unit 2. Assuming that the maximum signals of the adjusted signal are ARmax., AGmax., ABmax., the minimum signals of the adjusted signal are ARmin., AGmin., ABmin., matrixes K and J are calculated to satisfy the following formula.

$$\begin{bmatrix} ARmax \\ AGmax \\ ABmax \end{bmatrix} = \begin{bmatrix} Kr & Kg & Kb \\ Kr & Kg & Kb \\ Kr & Kg & Kb \end{bmatrix} \begin{bmatrix} M11 & M12 & M13 \\ M21 & M22 & M23 \\ M31 & M32 & M33 \end{bmatrix} \begin{bmatrix} Rmax \\ Gmax \\ Bmax \end{bmatrix} + \begin{bmatrix} Jr \\ Jg \\ Jb \end{bmatrix} \quad [\text{Formula 3}]$$

$$\begin{bmatrix} ARmin \\ AGmin \\ ABmin \end{bmatrix} = \begin{bmatrix} Kr & Kg & Kb \\ Kr & Kg & Kb \\ Kr & Kg & Kb \end{bmatrix} \begin{bmatrix} M11 & M12 & M13 \\ M21 & M22 & M23 \\ M31 & M32 & M33 \end{bmatrix} \begin{bmatrix} Rmin \\ Gmin \\ Bmin \end{bmatrix} + \begin{bmatrix} Jr \\ Jg \\ Jb \end{bmatrix}$$

Then, a set up matrix N is calculated based on the matrix K.

$$N = K \cdot M$$

The matrix form N is the set up matrix produced by the method (I) of describing the coordinate system before the conversion using the coordinate system after the conversion. In addition to the set up matrix N, the matrix J is stored inside as a constant. The matrix J is the constant produced by the method (I) of describing the coordinate system before the conversion using the coordinate system after the conversion.

Now, one concrete example will be explained. Assuming that the following values are defined for R, G, B components of an input color signal.

The minimum luminance of the R component: R min=30

The maximum luminance of the R component: R max=200

The minimum luminance of the G component: G min=20

The maximum luminance of the G component: G max=210

The minimum luminance of the B component: B min=10

The maximum luminance of the B component: B max=220

Setting values of these luminance is performed by sliding the mouse pointers 503a and 503b in FIG. 4(a). Supposing that each maximum luminance and each minimum luminance of the R, G, B components are defined as follows by adjusting this input color signal The maximum luminance=255

The minimum luminance=0

Describing the above maximum luminance and the minimum luminance in matrix, it is as follows.

$$\begin{bmatrix} AR\ max \\ AG\ max \\ AB\ max \end{bmatrix} = \begin{bmatrix} 255 \\ 255 \\ 255 \end{bmatrix} \quad \begin{bmatrix} AR\ min \\ AG\ min \\ AB\ min \end{bmatrix} = \begin{bmatrix} 0 \\ 0 \\ 0 \end{bmatrix}$$

In the case that, as assumed above, the values of the maximum luminance and the minimum luminance of R, G, B components of the input signal are as follows, $$\begin{bmatrix} R\ max \\ G\ max \\ B\ max \end{bmatrix} = \begin{bmatrix} 200 \\ 210 \\ 220 \end{bmatrix} \quad \begin{bmatrix} R\ min \\ G\ min \\ B\ min \end{bmatrix} = \begin{bmatrix} 30 \\ 20 \\ 10 \end{bmatrix}$$

the following can be shown by changing the form of the Formula 3 since the matrix M is a matrix unit.

$$\begin{bmatrix} 255 \\ 255 \\ 255 \end{bmatrix} = \begin{bmatrix} Kr & 0 & 0 \\ 0 & Kg & 0 \\ 0 & 0 & Kb \end{bmatrix} \begin{bmatrix} 200 \\ 210 \\ 220 \end{bmatrix} + \begin{bmatrix} Jr \\ Jg \\ Jb \end{bmatrix}$$

$$\begin{bmatrix} 0 \\ 0 \\ 0 \end{bmatrix} = \begin{bmatrix} Kr & 0 & 0 \\ 0 & Kg & 0 \\ 0 & 0 & Kb \end{bmatrix} \begin{bmatrix} 30 \\ 20 \\ 10 \end{bmatrix} + \begin{bmatrix} Jr \\ Jg \\ Jb \end{bmatrix}$$

The below values are calculated by solving the above.
Kr=1.5 kg=1.342 Kb=1.214 Jr=−45 Jg=−26.842 Jb=−12.143
Namely, the set up matrix N becomes as follows, $$N = \begin{bmatrix} 1.5 & 0 & 0 \\ 0 & 1.342 & 0 \\ 0 & 0 & 1.214 \end{bmatrix}$$

and the matrix J becomes as follows.

$$J = \begin{bmatrix} -45 \\ -26.842 \\ -12.143 \end{bmatrix}$$

Consequently each component of a color signal whose R, G, B components exist between the R min, G min, B min and the R max, G max, B max, can be converted into a value between 0 and 255.
For instance, $$\begin{bmatrix} R \\ G \\ B \end{bmatrix} = \begin{bmatrix} 200 \\ 210 \\ 220 \end{bmatrix} \text{ can be converted into } \begin{bmatrix} AR \\ AG \\ AB \end{bmatrix} = \begin{bmatrix} 255 \\ 255 \\ 255 \end{bmatrix}$$

But in the following case, the converted values of R component are not between 0 and 255 necessarily because original value of R component is more than R max. (210>200).

$$\begin{bmatrix} R \\ G \\ B \end{bmatrix} = \begin{bmatrix} 210 \\ 210 \\ 220 \end{bmatrix} \text{ can be converted into } \begin{bmatrix} AR \\ AG \\ AB \end{bmatrix} = \begin{bmatrix} 270 \\ 255 \\ 255 \end{bmatrix}$$

Thus, when the set up matrix N and the matrix J are calculated, the input color signal is converted into the adjusted color signal by using the calculated set up matrix N and the matrix J. When all of the R, G, B components of the input color signal are as follows, R component R min=<R=<R max G component G min=<G=<G max B component B min=<B=<B max all the components can be converted into the value between 0 and 255. As stated above, the luminance is adjusted and the adjusted image is produced by moving the mouse pointers 503a and 503b.

Process (2): The case of the mouse pointer 503c of the chroma being moved—Step S26

As shown in FIG. 4, there are a total of three mouse pointers at the bottom of the chroma information graph 5010. The mouse pointer changes the amount of the chroma of each color signal component.

When the color signal is expressed by three components, RGB, the changed amounts are: (1) the changed chroma amount of R component (ΔCR), (2) the changed chroma amount of C component (ΔCG), and (3) the changed chroma amount of B component (ΔCB). When the mouse pointer 503c is moved, information of the changed chroma amount is sent to the color adjusting unit 2. A matrix is set up based on the information, in the color adjusting unit 2. The following is calculated by assuming that the set up matrix is N.

$$N = \begin{bmatrix} M11 & M12+\Delta CG & M13+\Delta CB \\ M21+\Delta CR & M22 & M23+\Delta CB \\ M31+\Delta CR & M32+\Delta CG & M33 \end{bmatrix} \quad \text{[Formula 4]}$$

Now, one concrete example will be explained. The case of making red clearer will be described, here. Assuming that the changed amount of chroma, obtained by moving the mouse pointer 503c, are as follows, ΔCR=−0.037, ΔCG=−0.037, ΔCB=−0.037 the set up matrix N becomes $$N = \begin{bmatrix} 1 & -0.037 & -0.037 \\ -0.037 & 1 & -0.037 \\ -0.037 & -0.037 & 1 \end{bmatrix}.$$

When (R, G, B)=(255, 255, 255), it is normalized to be (AR, AG, AB)=(255, 255, 255). Then, assuming that the normalized set up matrix is N', N' becomes as follows.

$$N' = \begin{bmatrix} 1.082 & -0.041 & -0.041 \\ -0.041 & 1.082 & -0.041 \\ -0.041 & -0.041 & 1.082 \end{bmatrix}$$

That is $$N' \cdot \begin{bmatrix} R \\ G \\ B \end{bmatrix} = \begin{bmatrix} 1.082 & -0.041 & -0.041 \\ -0.041 & 1.082 & -0.041 \\ -0.041 & -0.041 & 1.082 \end{bmatrix} \begin{bmatrix} 255 \\ 255 \\ 255 \end{bmatrix} = \begin{bmatrix} 255 \\ 255 \\ 255 \end{bmatrix} = \begin{bmatrix} AR \\ AG \\ AB \end{bmatrix}$$

This proves to have been normalized.

Substituting (R, G, B)=(200, 10, 10) for the above, $$N' \cdot \begin{bmatrix} 200 \\ 10 \\ 10 \end{bmatrix} = \begin{bmatrix} 1.082 & -0.041 & -0.041 \\ -0.041 & 1.082 & -0.041 \\ -0.041 & -0.041 & 1.082 \end{bmatrix} \begin{bmatrix} 200 \\ 10 \\ 10 \end{bmatrix} = \begin{bmatrix} 215.5 \\ 2.2 \\ 2.2 \end{bmatrix} = \begin{bmatrix} AR \\ AG \\ AB \end{bmatrix}$$

Surveying the changed values of the above, the followings can be known.

When R→AR, 200→215.5

When G→AG, 10→2.2

When B→AB, 10→2.2

Since the R component increases and the G, B components decrease, clearer red can be obtained.

Process (3): The case of the mouse pointer 503d of the hue being moved—Step S27

As shown in FIG. 4, there are a total of three mouse pointers at the bottom of the hue information graph 5020. The mouse pointer changes the amount of the hue of each color signal component. For a RGB color signal, the changed amounts are: (1) the changed hue amount of R component (ΔHR), (2) the changed hue amount of G component (ΔHG), (3) the changed hue amount of B component (ΔHB). When the mouse pointer 503d is moved, information of the changed hue amount is sent to the color adjusting unit 2. A matrix is set up based on the information, in the color adjusting unit 2. Assuming that the set up matrix is N, the following is calculated when the changed amount of the hue is negative.

$$N = \begin{bmatrix} M11 & M12+\Delta HG & M13 \\ M21 & M22 & M23+\Delta HB \\ M31+\Delta HR & M32 & M33 \end{bmatrix} \quad \text{[Formula 5]}$$

Assuming that the set up matrix is N, the following is calculated when the changed amount of the hue is positive.

$$N = \begin{bmatrix} M11 & M12 & M13+\Delta HB \\ M21+\Delta HR & M22 & M23 \\ M31 & M32+\Delta HG & M33 \end{bmatrix} \quad \text{[Formula 6]}$$

One concrete example will be described. The case of rotating from R to B to G will be explained. Assuming that the changed amount of hue, obtained by moving the mouse pointer 503d, are as follows,

ΔHR=−0.038, ΔHG=−0.038, ΔHB=−0.038 the set up matrix N becomes as follows.

$$N = \begin{bmatrix} 1 & -0.038 & 0 \\ 0 & 1 & -0.038 \\ -0.038 & 0 & 1 \end{bmatrix}$$

When (R, G, B)=(255, 255, 255), it is normalized to be (AR, AG, AB)=(255, 255, 255). Then, assuming that the normalized set up matrix is N', N' becomes as follows.

$$N' = \begin{bmatrix} 1.041 & -0.041 & 0 \\ 0 & 1.041 & -0.041 \\ -0.041 & 0 & 1.041 \end{bmatrix}$$

Substituting (R, G, B) (200, 10, 10) for the above, $$N' \cdot \begin{bmatrix} 200 \\ 10 \\ 10 \end{bmatrix} = \begin{bmatrix} 1.041 & -0.041 & 0 \\ 0 & 1.041 & -0.041 \\ -0.041 & 0 & 1.041 \end{bmatrix} \begin{bmatrix} 200 \\ 10 \\ 10 \end{bmatrix} \approx \begin{bmatrix} 208 \\ 10 \\ -2 \end{bmatrix}$$

Regarding to G-B plane, since (G, B)=(10, 10) is changed to be (G, B)=(10, −2), the color signal changes as shown in FIG. 8(d). Accordingly, it becomes more greenish brown. Although the AR=208 here, this value is ignored in this method.

As described in the above example, though it is easy to apply values for the calculation and to interpret the calculated result, it is difficult to handle the values themselves in the operation. By providing the man-machine interface as shown in this embodiment, it can be possible to adjust the color without handling the values, which is an advantage of this system. Concretely, the above mentioned can be performed easily by a simple operation of moving the mouse pointers, producing the set up matrix and adjusting the color with calculating the produced matrix and the input color signal.

After finishing the above process (1) or (2) or (3), the flow goes to the process of "PRODUCING ADJUSTED IMAGE" at step S28. At this process, the adjusted image 52 is produced from the original image 51 displayed in the image display unit 5. Then, the flow goes to the process of "SENDING TO IMAGE DISPLAY UNIT 5", at step S29. The produced adjusted image is sent to the image display unit 5 and displayed there. After this, the flow loops waiting for the direction from the image display unit 5, at step S24. Thus, it is possible to adjust the color any number of times.

Process (4): The case of the END switch 504 being turned on—Step S30

When the END switch 504 is turned on, the operation of the color adjusting unit 2 goes to "END" at step S30.

As described above, the case of one of the mouse pointers of the luminance, the chroma, the hue being moved and the matrix being set up separately depending upon each of the cases, are explained with reference to the flowchart of FIG. 9.

Figure 10:
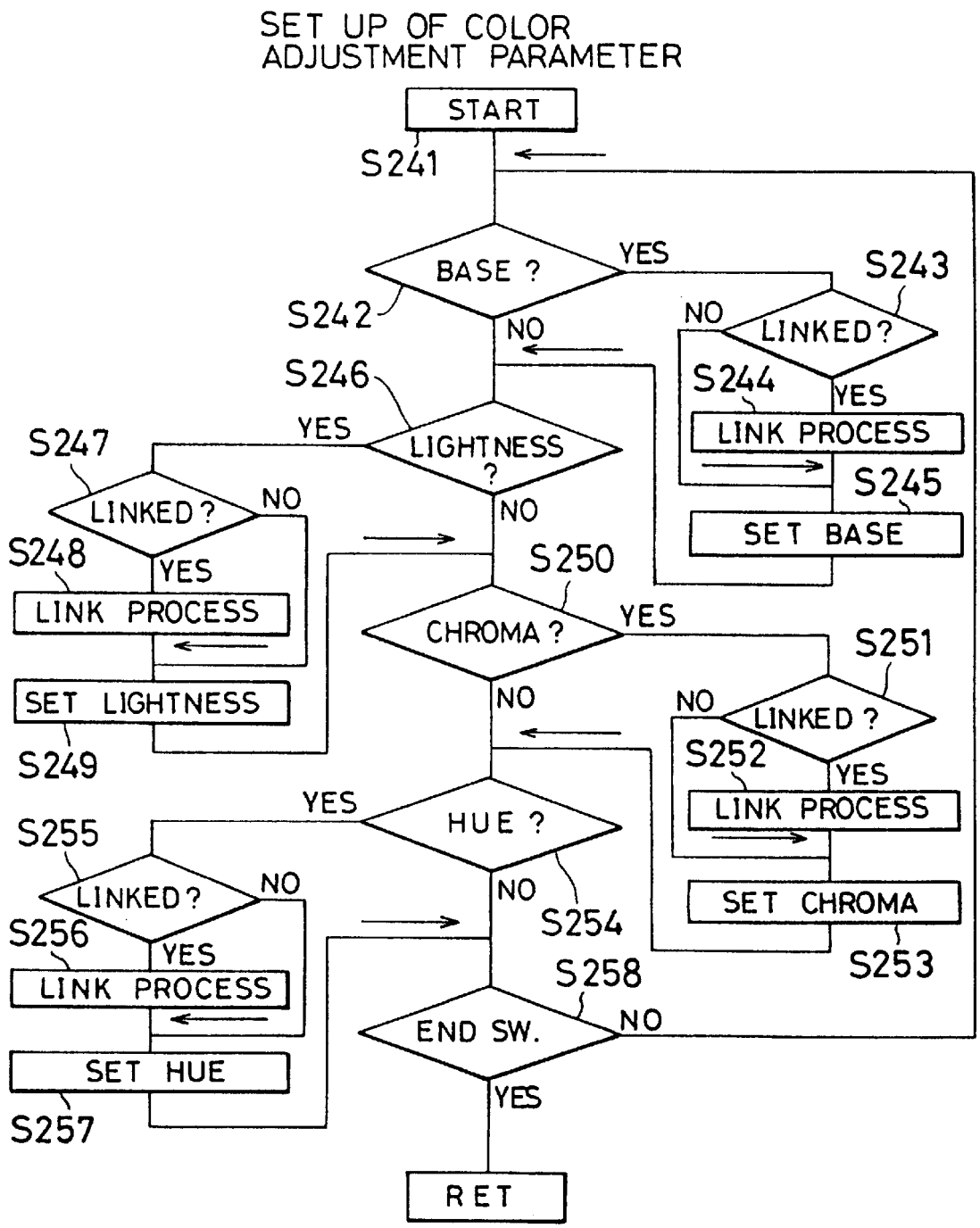
FIG. 10 illustrates operation of a color adjusting unit according to the first embodiment of the present invention.
Figure 24:
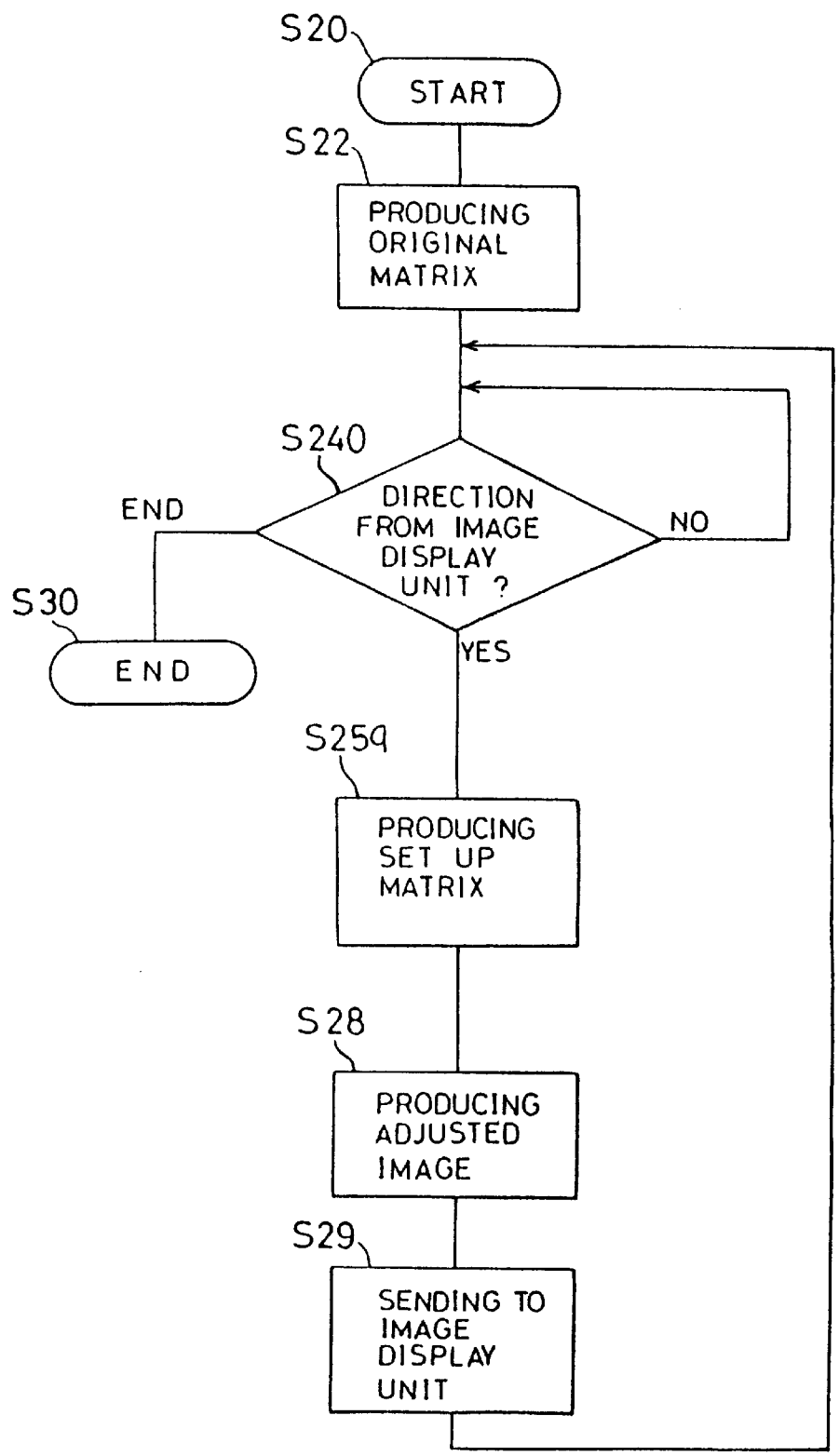
FIG. 24 illustrates operation of a color adjusting unit according to the first embodiment of the present invention.
Figure 25:
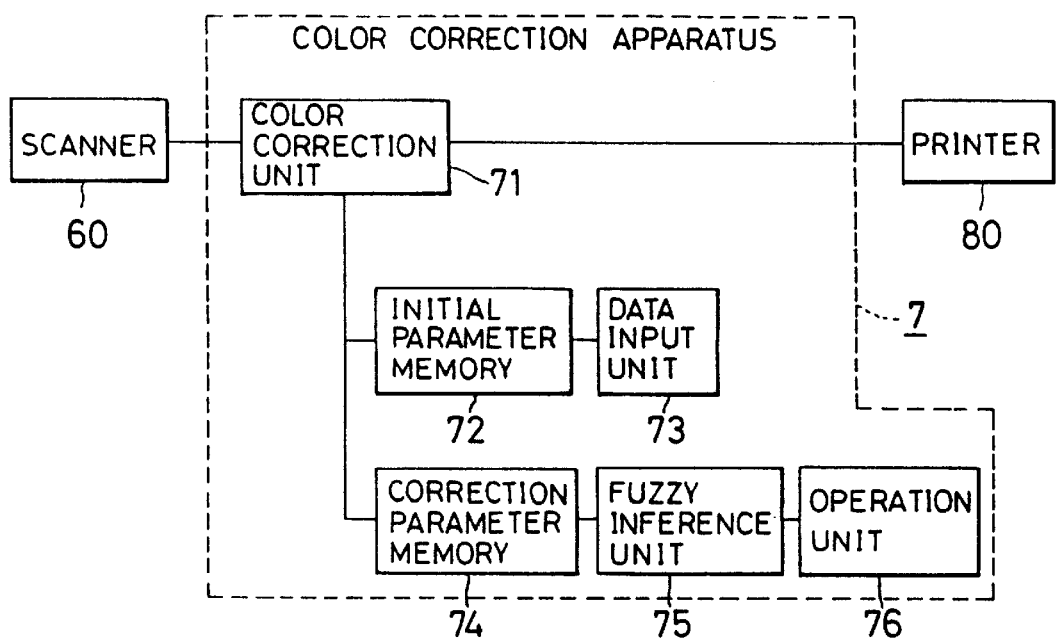
FIG. 25 is a block diagram showing a configuration of a conventional color correction apparatus.
Figure 26:
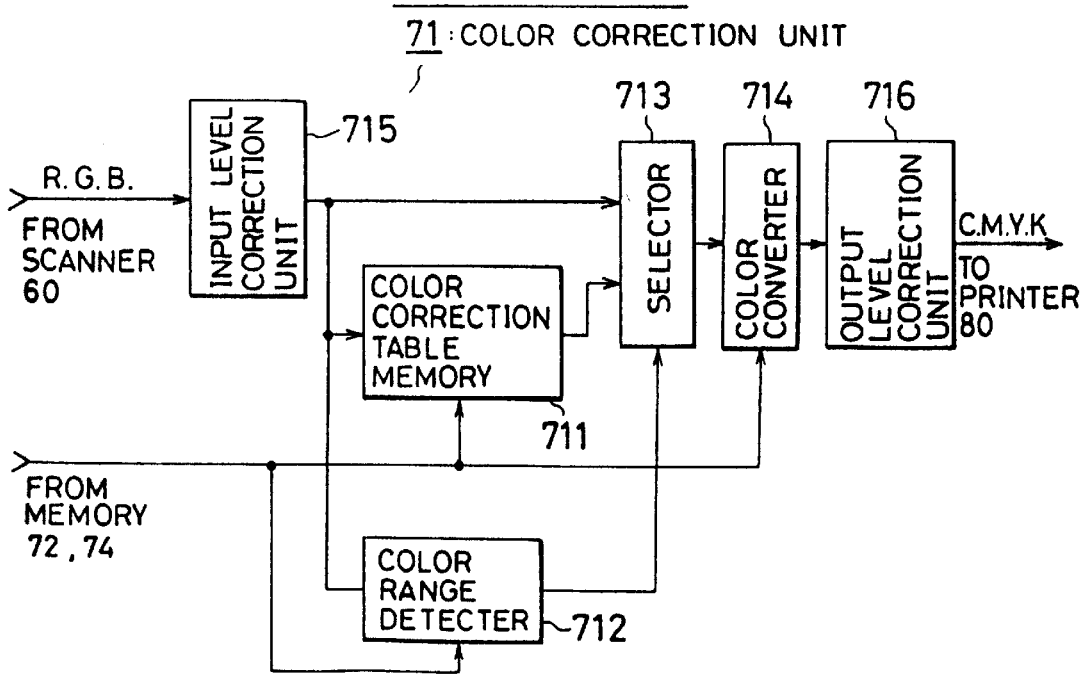
FIG. 26 is a block diagram showing a configuration of a color correction unit of the conventional color correction apparatus.
Figure 27:
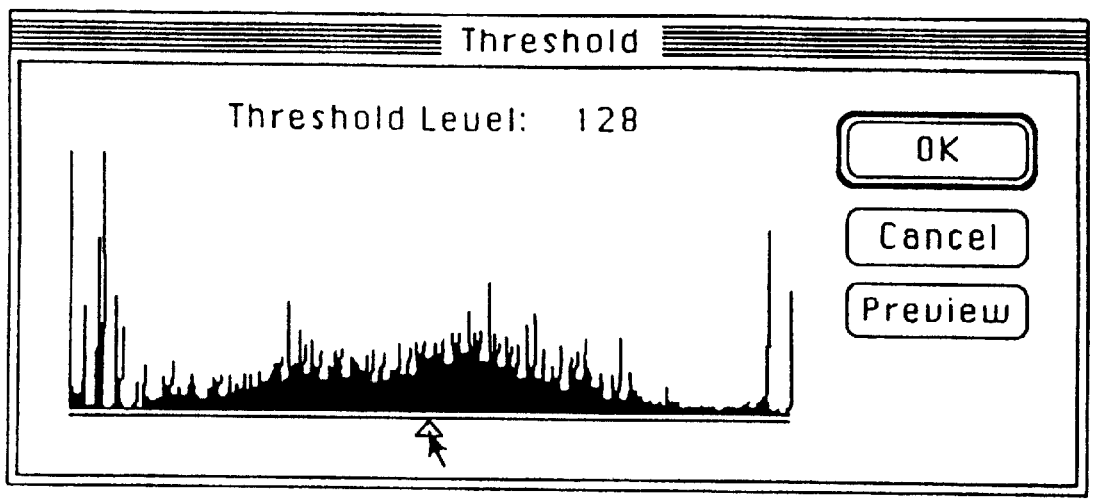
FIG. 27 shows a dialogue box of a conventional color adjusting software.
Figure 28:
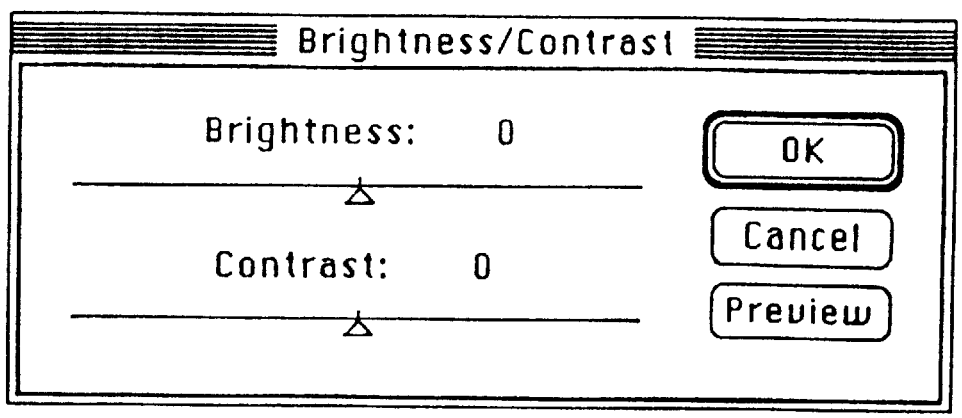
FIG. 28 shows a dialogue box of the conventional color adjusting software.
Figure 29:
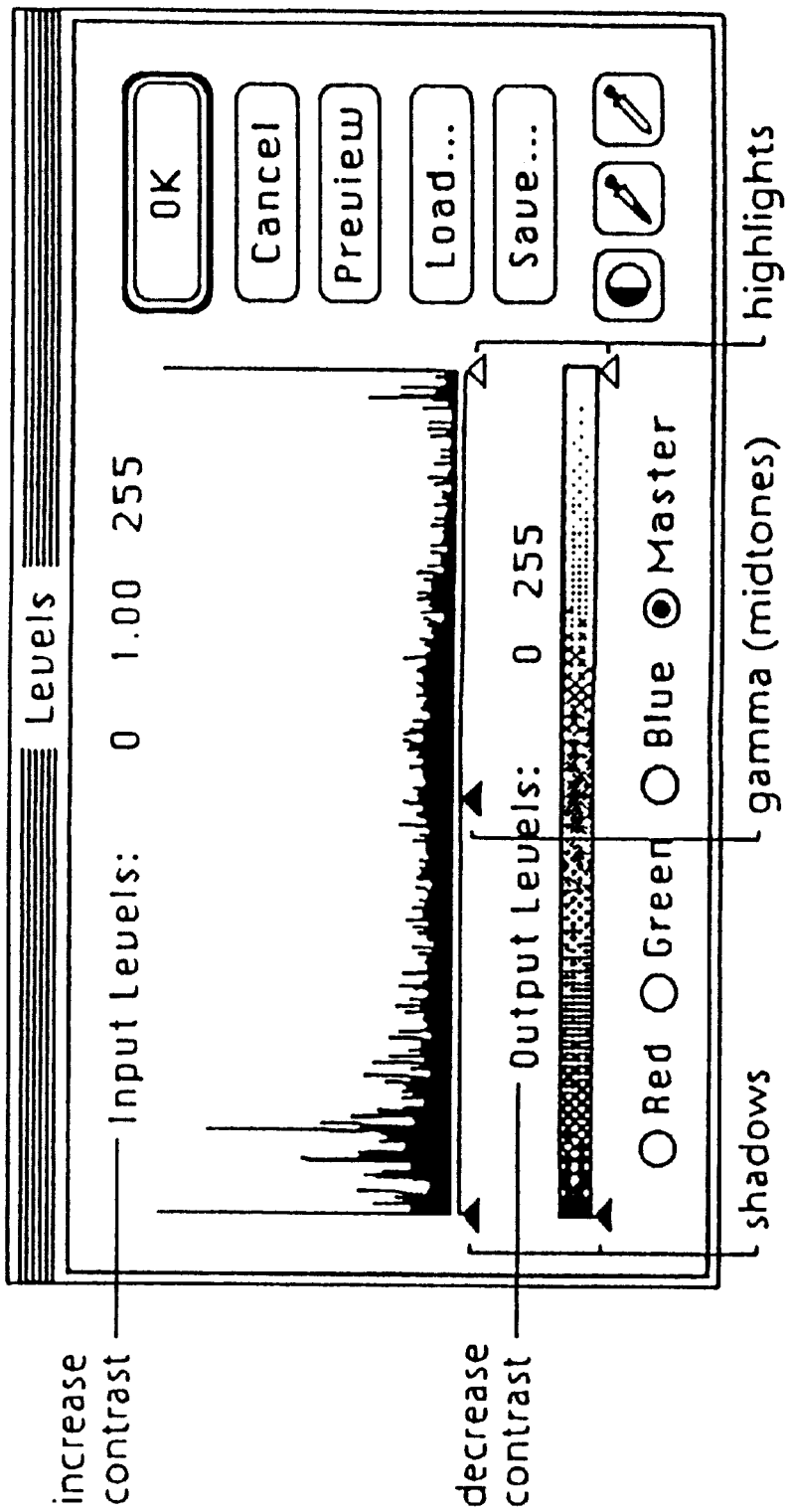
FIG. 29 shows a dialogue box of the conventional color adjusting software.
Figure 30:
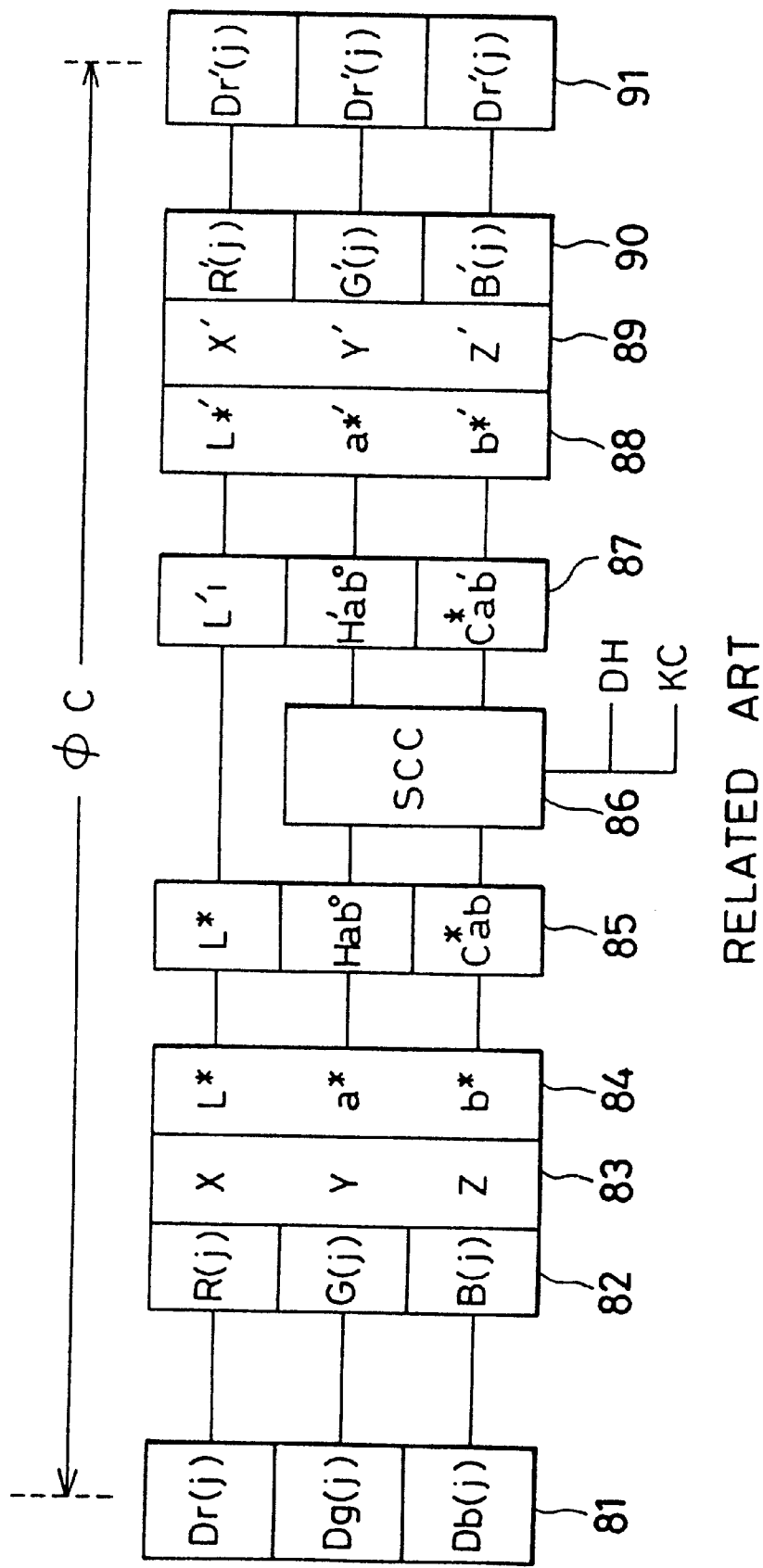
FIG. 30 illustrates a system of a color adjusting method of a conventional color image.

Now, the case of the luminance, chroma, hue being adjusted simultaneously will be explained with reference to FIGS. 24 and 10. FIG. 10 is a flowchart which shows a process of watching the "DIRECTION FROM IMAGE DISPLAY UNIT 5" at step S240 in FIG. 24. This flowchart of FIG. 10 is for setting the minimum luminance, the maximum luminance, the changed amount of chroma and the changed amount of hue as color adjustment parameters.

The flow starts from "start" at step S241. It is judged at step S242 if the mouse pointer 503a for adjusting the base is moved or not. When the mouse pointer 503a is moved, whether a link process will be performed or not is judged at step S243. The link process means the process that when one of three mouse pointers is moved, the other two are also moved to the same direction and the same distance as the first one. It has been directed in advance whether the link process is performed or each mouse pointer is moved separately. Referring to the direction, it is judged at step S243 to perform the link process or the separate process. When the link process is judged at step S243, the other two mouse pointers are moved at step S244.

At step S245, the direction and the distance of the moved mouse pointer are judged and a new base is set up. In the process of step S245, directed value is stored as the minimum luminance. At this point, the set up matrix is not produced. In the case of the separate process, each base of the moved mouse pointers is set up. In the case of the link process, same base for the three mouse pointers is set up.

It is judged at step S246 if the mouse pointer 503b for indicating lightness is moved or not. When the mouse pointer 503b is moved, to perform the link process or not to is judged at step S247. In the case of the link process, the other two mouse pointers are also moved in the same way as the first, at step S248. The lightness indicating the maximum luminance is set up based on the direction and the distance of the moved mouse pointer, at step S249. In the process of step S249, the directed value is stored as the maximum luminance. At this point, the set up matrix is not produced. In the case of the separate process, each lightness is set up based on the moved direction and the moved distance of each mouse pointer. In the case of the link process, same lightness for the three mouse pointers is set up.

It is judged at step S250 if the mouse pointer 503c for adjusting chroma is moved or not. When the mouse pointer 503c is moved, to perform the link process or not to is judged at step S251. The link process for other two mouse pointers is performed at step S252. Then, chroma is set up based on the moved mouse pointer, at step S253. In the process of step S253, the directed value is stored as the changed amount of chroma. At this point, the set up matrix is not produced.

It is judged at step S254 if the mouse pointer 503d for adjusting hue moved or not. When the mouse pointer 503d is moved, to perform the link process or not to is judged at step S255. In the case of the link process, the other two mouse pointers are moved at step S256. Hue is set up based on the moved mouse pointer, at step S257. In the process of step S257, the directed value is stored as the changed amount of hue. At this point, the set up matrix is not produced.

If the END switch 504 is turned on or not is judged at step S258. When the END switch is not turned on, the flow loops to come to the "start" again. When the END switch 504 is turned on, the process of the flowchart in FIG. 10 is finished. This means the process at step S240 of FIG. 24 is finished. At the point of the process of step S240 being finished, the minimum luminance, the maximum luminance, the changed amount of chroma, the changed amount of hue are already set up as the color adjustment parameters. At step of S259, the set up matrix is produced by using the color adjustment parameters. By executing processes of steps S25 to S27 shown in FIG. 9 in order, the set up matrix is produced at the step S259.

"SET BASE" described at step S245, will be further explained.

The case of the mouse pointer 503a being at level 128 first and being moved in the direction of arrow A, as shown in FIG. 5, will be explained.

Assuming that the mouse pointer 503a is moved by 32 in the direction of arrow A, the base (the minimum luminance) becomes 128−32=96. In this case, the value of the base parameter Kn is −32.

The "SET BASE" process at step S245 of FIG. 10 is performed by calculating a new base as a base parameter Kn. By moving the mouse pointer 503b by 32 in the direction of arrow B, the lightness (the maximum luminance) becomes 128+32=160. The "SET LIGHTNESS" process at step S249 of FIG. 10 is performed by calculating a new lightness as a lightness parameter Ln. In this case, the value of the lightness parameter Ln is +32.

The "SET CHROMA" at step S253 will be explained. By moving the mouse pointer 503c in FIG. 6 by 64 in the direction of arrow A, the changed amount of the chroma becomes +64. The "SET CHROMA" at step S253 sets up the changed amount of the chroma as a chroma parameter Cn. In this case, the value of the chroma parameter Cn is +64.

The "SET HUE" at step S257 will now be explained. As shown in FIG. 7, in the case of the mouse pointer 503d for indicating the hue being moved by 10 degrees in the direction of arrow A, the changed amount of the hue becomes +10 degrees. The "SET HUE" at step S257 sets up the changed amount of the hue as a hue parameter Hn. In this case, the value of the hue parameter Hn is +10.

As stated above, the operation of the color adjusting unit 2 is explained based on the set up matrix produced by the method (I) of describing the coordinate system before the conversion using the coordinate system after the conversion.

Figure 11A:
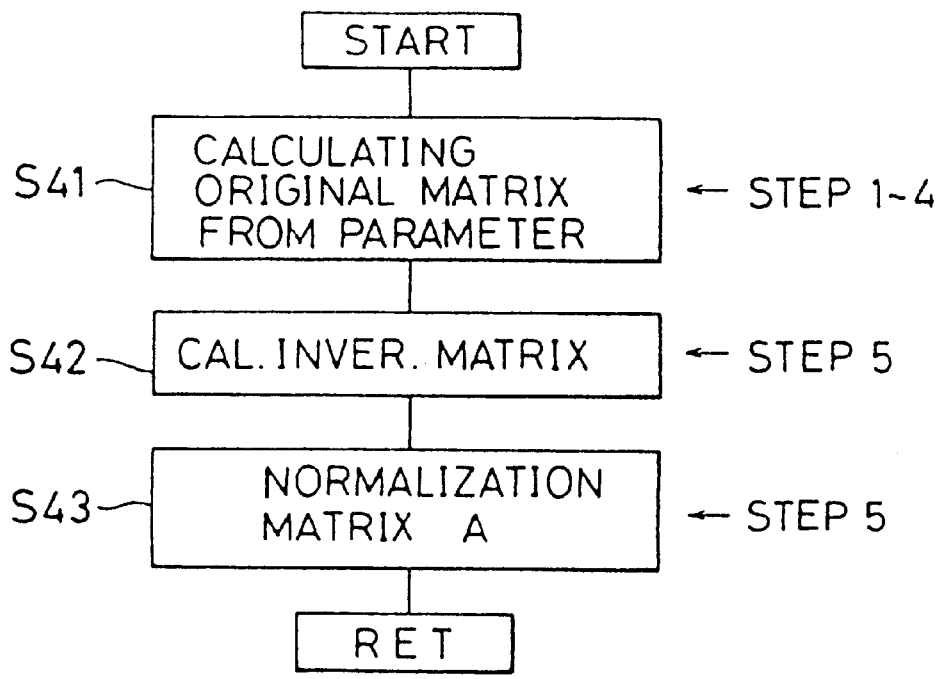
FIGS. 11A–11B (also referred to collectively as FIG. 11 and described herein as FIGS. 11(a)–11(b)) illustrate operation of the color adjusting unit according to the first embodiment of the present invention.

Now, the operation of the color adjusting unit 2 will be explained based on the set up matrix produced by the method (II) of describing the coordinate system after the conversion using the coordinate system before the conversion. FIG. 11 shows a flowchart for producing the set up matrix based on the method (II) of describing the coordinate system after the conversion using the coordinate system before the conversion. The flowchart of FIG. 11 corresponds to the process of producing the set up matrix at the step S259 in FIG. 24.

The procedure of producing the matrix will be explained along the order from step S41 to step S43. The following steps 1 to 5 are needed to produce the color adjustment matrix. Procedure of producing the color adjustment matrix on the assumption that the color adjustment parameters are already set up based on the flowchart of FIG. 10 by the user, will be described here.

The color adjustment parameters set by the user are defined as follows:

base parameter Kn lightness parameter Ln chroma parameter Cn hue parameter Hn

The letter n corresponds to r, g, b for red, green, blue in the case of primary colors, to y, m, c for yellow, magenta, cyan in the case of complementary colors.

Values "0.32", "10" described in the following matrixes are coefficients for the conversion. Different values are set for these coefficients depending upon the relation of the coordinate systems before the conversion and after the conversion. The case of "0.32" and "10" being used will be explained hereinafter.

Step 1: The following matrix is produced from the chroma parameter. This method is applied in both cases of the primary colors and the complementary colors.

$$\begin{bmatrix} 0.32*Cr & 0.32*Cg & 0.32*Cb \\ 0.32*Cr & 0.32*Cg & 0.32*Cb \\ 0.32*Cr & 0.32*Cg & 0.32*Cb \end{bmatrix} \text{ or }$$

$$\begin{bmatrix} 0.32*Cy & 0.32*Cm & 0.32*Cc \\ 0.32*Cy & 0.32*Cm & 0.32*Cc \\ 0.32*Cy & 0.32*Cm & 0.32*Cc \end{bmatrix}$$

[Formula 7]

Step 2: The above matrix is changed by using the hue parameter.

In the case of the value of the hue parameter Cr, Cg, Cb or Cy, Cm, Cc being positive, the matrix is: for the primary color $$\begin{bmatrix} 10 & 0.32*Cg & 0.32*(Cb+Hb) \\ 0.32*(Cr+Hr) & 10 & 0.32*Cb \\ 0.32*Cr & 0.32*(Cg+Hg) & 10 \end{bmatrix} \quad \text{[Formula 8]}$$

for the complementary color $$\begin{bmatrix} 10 & 0.32*(Cm+Hm) & 0.32*Cc \\ 0.32*Cy & 10 & 0.32*(Cc+Hc) \\ 0.32*(Cy+Hy) & 0.32*Cm & 10 \end{bmatrix} \quad \text{[Formula 9]}$$

In the case of the value the hue parameter Cr, Cg, Cb or Cy, Cm, Cc being negative, the matrix
Calculation for the primary color $$\begin{bmatrix} 10 & 0.32*(Cg+Hg) & 0.32*Cb \\ 0.32*Cr & 10 & 0.32*(Cb+Hb) \\ 0.32*(Cr+Hr) & 0.32*Cg & 10 \end{bmatrix} \quad \text{[Formula 10]}$$

Calculation for the complementary color $$\begin{bmatrix} 10 & 0.32*Cm & 0.32*(Cc+Hc) \\ 0.32*(Cy+Hy) & 10 & 0.32*Cc \\ 0.32*Cy & 0.32*(Cm+Hm) & 10 \end{bmatrix} \quad \text{[Formula 11]}$$

When both positive and negative values exist in the hue parameter Cr, Cg, Cb or Cy, Cm, Cc, the matrix is changed depending upon the above two examples. For instance, the case of the hue parameter of red being positive, the hue parameter of green being negative, and that of blue being positive at the calculation for the primary color becomes as follows. Formula 8 is applied for the hue parameter of red, Formula 10 is for the hue parameter of green, and Formula 8 for the hue parameter of blue.

$$\begin{bmatrix} 10 & 0.32*(Cg+Hg) & 0.32*(Cb+Hb) \\ 0.32*(Cr+Hr) & 10 & 0.32*Cb \\ 0.32*Cr & 0.32*Cg & 10 \end{bmatrix} \quad \text{[Formula 12]}$$

Step 3: The 3×3 matrix produced by the above step is defined as a matrix A. A determinant $|A|$ and a cofactor matrix (or algebraic complement matrix) $\overline{A}$ of the matrix A are calculated.

Step 4: A normalization factor (Wm and Bm: m is r, g, b or y, m, c) is calculated from the base parameter and the lightness parameter. Values of the normalization factors Wm and Bm are set to output 255 as the maximum luminance value and 0 as the minimum luminance value when the values of the normalization factors of the Wm and the Bm are input. The lightness parameter is converted as Lm=255−Ln.

The case of the primary color calculation
Wm=Km, Bm=Lm
The case of the complementary color calculation
Wm=255−Lm, Bm=255−Km Step 5: An inverse matrix $A^{-1}$ is calculated from the determinant $|A|$ and the cofactor matrix $\overline{A}$ (or algebraic complement matrix) and, 0 and 255 are output when the normalization factor Wm, Bm is input. Concrete procedure of the step 5 is as follows.

A matrix corresponds to Formula 12 is defined as the matrix A, here. R, G, B are defined as data of the original image to be adjusted, AR, AG, AB are defined as data of the adjusted image. In the procedure of this embodiment, the data of the original image to be adjusted (R, G, B) are calculated from the adjusted image data (AR, AG, AB). Formula for the calculation is as follows.

$$\begin{bmatrix} R \\ G \\ B \end{bmatrix} = A \begin{bmatrix} AR \\ AG \\ AB \end{bmatrix} + P$$

Matrix P is not defined yet, here. Changing the style of the formula, it will be as follows.

$$\begin{bmatrix} AR \\ AG \\ AB \end{bmatrix} = A^{-1} \left\{ \begin{bmatrix} R \\ G \\ B \end{bmatrix} - P \right\}$$

$$= \frac{1}{|A|} \overline{A} \left\{ \begin{bmatrix} R \\ G \\ B \end{bmatrix} - P \right\}$$

$A^{-1}$ is the inverse matrix of the matrix A, here. $|A|$ is the determinant of the matrix A calculated in the step 3. $\overline{A}$ is the cofactor matrix calculated in the step 3. There is a following relation between the inverse matrix $A^{-1}$, the determinant $|A|$, and the cofactor matrix $\overline{A}$.

$$A^{-1} = \frac{1}{|A|} \overline{A}$$

As described above, the inverse matrix $A^{-1}$ is calculated from the determinant $|A|$ and the cofactor matrix $\overline{A}$ calculated in the step 3.

Figure 11B:
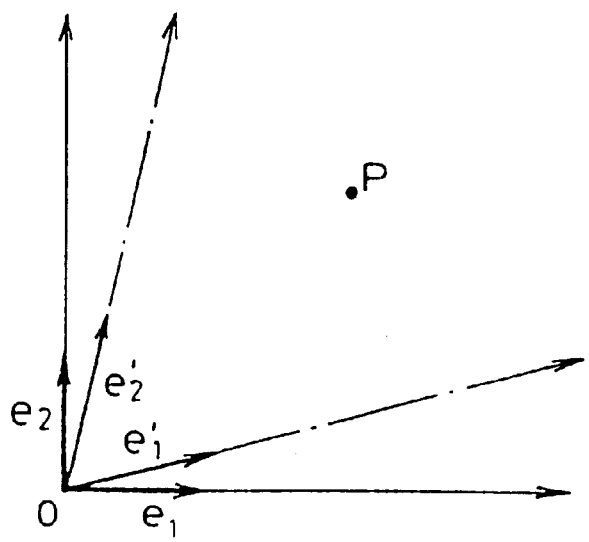

Now, the reason for calculating the inverse matrix will be explained with reference to FIG. 11(b). To simplify the explanation, it is described in two dimensions. In FIG. 11(b), $e_1$, $e_2$ are unit vectors in the coordinate system before the conversion, $e_{1'}$, $e_{2'}$ are unit vectors in the coordinate system after the conversion. It is assumed that a vector $\overrightarrow{OP}$ is described as follows.

$$\overrightarrow{OP} = m_1 e_1 + m_2 e_2 \quad (1)$$

That is, it is assumed that the value of P before the conversion is $(m_1, m_2)$.

On the other hand, the vector $\overrightarrow{OP}$ can be described as follows after the conversion in the coordinate system.

$$\overrightarrow{OP} = m_{1'} e_{1'} + m_{2'} e_{2'} \quad (2)$$

Therefore, the value of P after the conversion becomes $(m_{1'}, m_{2'})$. The one which relates the value $(m_1, m_2)$ and $(m_{1'}, m_{2'})$ is the set up matrix. The unit vectors $e_{1'}$, $e_{2'}$ after the conversion are described using the unit vectors $e_1$, $e_2$ before the conversion, as follows.

$$e_{1'} = a_{11} e_1 + a_{12} e_2 \quad (3)$$

$$e_{2'} = a_{21} e_1 + a_{22} e_2 \quad (4)$$

Combining the (1), (2), (3) and (4), the conversion can be described as follows.

$$m_1 e_1 + m_2 e_2 = m_{1'} e_{1'} + m_{2'} e_{2'}$$
$$= m_{1'}(a_{11} e_1 + a_{12} e_2) + m_{2'}(a_{21} e_1 + a_{22} e_2)$$
$$= (m_{1'} a_{11} + m_{2'} a_{21}) e_1 + (m_{1'} a_{12} + m_{2'} a_{22}) e_2$$

Accordingly, $$m_1 = m_{1'} a_{11} + m_{2'} a_{21}$$
$$m_2 = m_{1'} a_{12} + m_{2'} a_{22}$$

Describing the above in the matrix form, $$\begin{bmatrix} m_1 \\ m_2 \end{bmatrix} = \begin{bmatrix} a_{11} & a_{21} \\ a_{12} & a_{22} \end{bmatrix} \begin{bmatrix} m_{1'} \\ m_{2'} \end{bmatrix} \quad (5)$$

This matrix is the formula for converting the value ($m_{1'}$, $m_{2'}$) after the conversion into the value ($m_1$, $m_2$) before the conversion. Therefore, an inverse relational expression can be obtained by calculating the inverse matrix. The matrix calculated in the above steps 1 to 4, corresponds to the matrix of (5). The formula for converting the value before the conversion into the value after the conversion by calculating the inverse matrix can be obtained at the step (5).

In the above (3) and (4), the unit vector of after the conversion is described with the unit vector of before the conversion. (This corresponds to the foregoing method (II)).

It is also possible to describe the unit vector of before the conversion with the unit vector of after the conversion. (This corresponds to the foregoing method (I)).

The logic of (I) and (II) tells the same thing from the different aspects. The same result of the color adjustment can be obtained by using the logic of either (I) or (II). The logic from the aspect of (II) is described in the formulas 7 to 12 and that of (I) is in the formulas 3 to 6. The logic of (I) and (II) seems to be different depending upon how the interface is formed.

In the step 5, P is calculated from the normalization factors Wm and Bm. According to the normalization factors Wm and Bm, $$\begin{bmatrix} Wr \\ Wg \\ Wb \end{bmatrix} = A \begin{bmatrix} 255 \\ 255 \\ 255 \end{bmatrix} + P$$

$$\begin{bmatrix} Br \\ Bg \\ Bb \end{bmatrix} = A \begin{bmatrix} 0 \\ 0 \\ 0 \end{bmatrix} + P$$

That is, $$\begin{bmatrix} 255 \\ 255 \\ 255 \end{bmatrix} = A^{-1} \left\{ \begin{bmatrix} Wr \\ Wg \\ Wb \end{bmatrix} - P \right\}$$

$$\begin{bmatrix} 0 \\ 0 \\ 0 \end{bmatrix} = A^{-1} \left\{ \begin{bmatrix} Br \\ Bg \\ Bb \end{bmatrix} - P \right\}$$

The matrix P is calculated from the above two formulas. Since the matrix A is produced from the parameters directly, it is not normalized yet, at this point. The normalization of the matrix A is performed by the above two formulas. Thus, 3×3 matrix Ni can be calculated as the normalized inverse matrix $A^{-1}$. 3×1 matrix J1 can be calculated by $J1 = -A^{-1} \cdot P$ By performing the above procedures, 3×3 matrix Ni and 3×1 matrix J1 can be calculated. The matrix N1 is the set up matrix produced by the method (II) of describing the coordinate system after the conversion using the coordinate system before the conversion. The matrix J1 is the constant produced by the method (II) of describing the coordinate system after the conversion using the coordinate system before the conversion. The matrix Ni and the matrix J1 are stored for a conversion of the image data.

Figure 12:
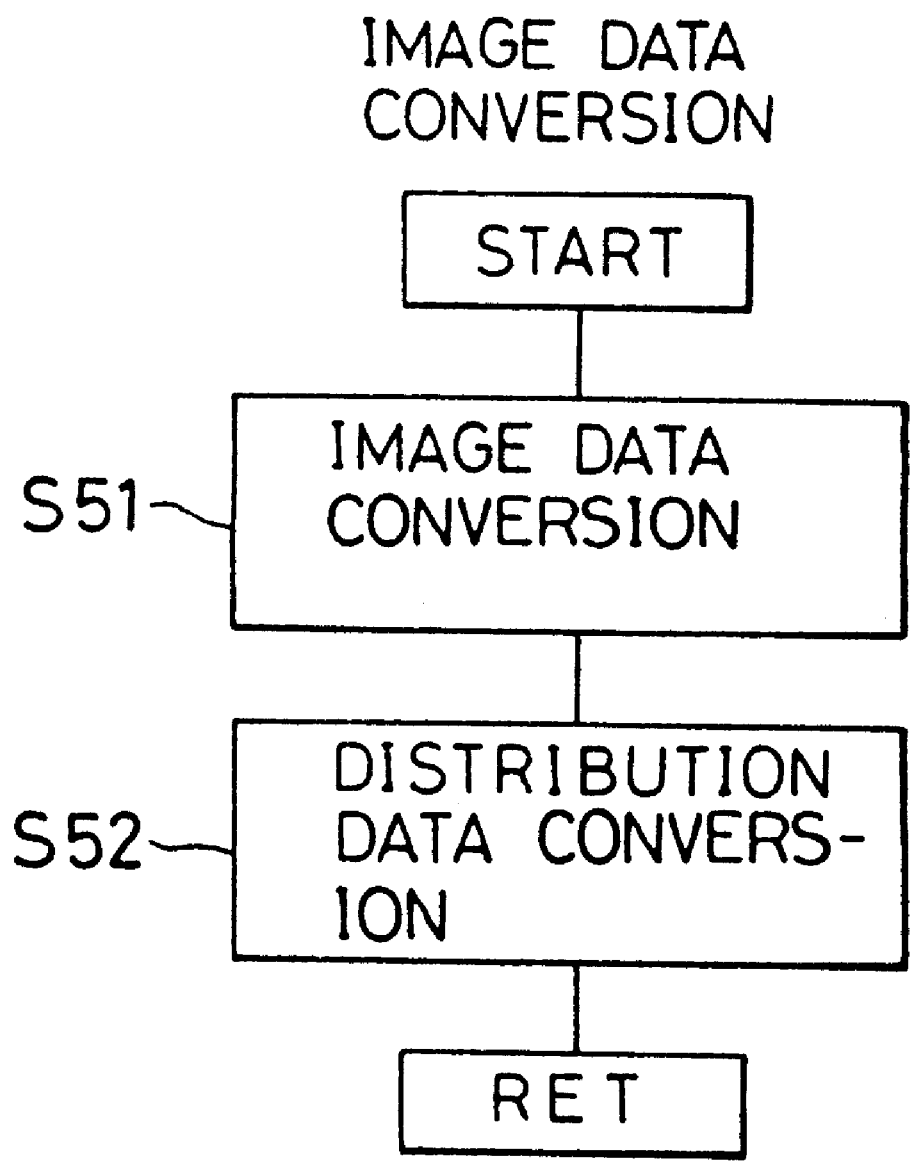
FIG. 12 illustrates operation of the color adjusting unit according to the first embodiment of the present invention.

Now, the conversion of the image data will be explained with reference to FIG. 12 (step S51). The process of converting image data of FIG. 12 corresponds to the process of step S28 of FIGS. 9 and 24.

When an original image is converted into an adjusted image, the conversion method varies depending upon a selection value of γ correction. This will be described now.
* The Case of a Dense Linear When a dense linear is selected, data calculated for complementary colors are output in RGB by the scanner. In this case, the color adjustment matrix produced by the complementary color calculation form is used. The conversion calculation is as follows.

$$\begin{bmatrix} \sim AB \\ \sim AG \\ \sim AR \end{bmatrix} = NI \cdot \begin{bmatrix} \sim B \\ \sim G \\ \sim R \end{bmatrix} + JI \qquad \text{[Formula 13]}$$

R, G, B stand for data of the original image to be adjusted, AR, AG, AB stand for data of the adjusted image, and ~ stands for an inversion of 8 bits.
* The Case of a Reflection Ratio Linear When a reflectance ratio linear is selected, data calculated for primary color are output by the scanner. In this case, the color adjustment matrix produced by the primary color calculation form is used. The conversion calculation is as follows.

$$\begin{bmatrix} AR \\ AG \\ AB \end{bmatrix} = NI \cdot \begin{bmatrix} R \\ G \\ B \end{bmatrix} + JI \qquad \text{[Formula 14]}$$

R, G, B stand for data of the original image to be adjusted, AR, AG, AB stand for data of the adjusted image. At step S52 in FIG. 12, distribution data are produced based on the adjusted image produced at step S51.

Figure 13:
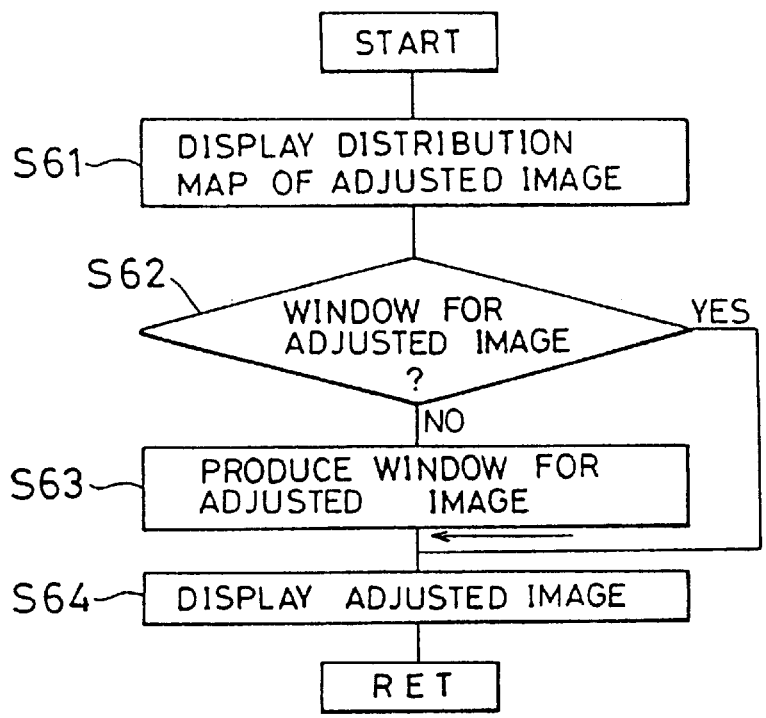
FIG. 13 illustrates operation of the color adjusting unit according to the first embodiment of the present invention.

A display of an adjusted image data will be described with respect to FIG. 13. Process of displaying adjusted image data of FIG. 13 corresponds to the process of step S29 in FIGS. 9 and 24. At step S61, the distribution data produced at step S52 of FIG. 12 are displayed in the color information display area 50. At step S62, whether or not a window for displaying the adjusted image exists in the image display unit 5 already is checked when the adjusted image produced at step S51 is displayed. When the window for displaying the adjusted image does not exist, the window for the adjusted image is produced at step S63. The adjusted image is displayed with the window produced in the image display unit 5, at step S64.

As described above, when the parameters of the luminance, chroma and hue are changed simultaneously, it is possible to produce one set up matrix. The procedure of the foregoing steps 1 to 5 for producing the set up matrix includes a method of calculating the complicated matrix calculation efficiently. Accordingly, it is not always necessary to perform the all steps 1 to 5. Other orders of the steps and other methods of producing the set up matrix are acceptable.

The way how the image is adjusted by the operation of the color adjusting unit 2 will be described based on an experiment result with respect to FIGS. 14 to 16.

Figure 14A:
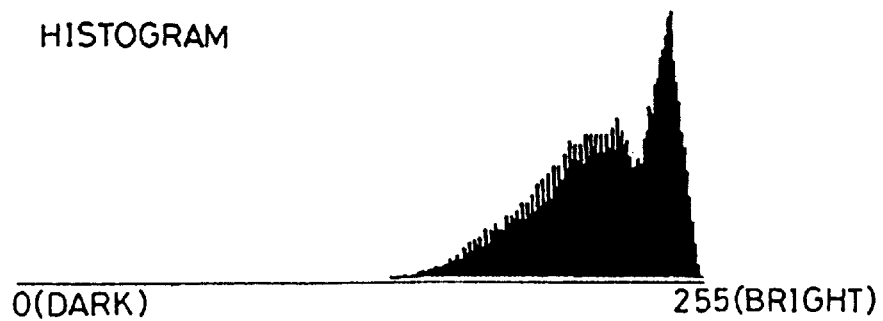
FIGS. 14A–14B (also referred to collectively as FIG. 14 and described herein as FIGS. 14(a)–14(b)) show a first result of an experiment of color adjusting according to the first embodiment of the present invention.
Figure 14B:
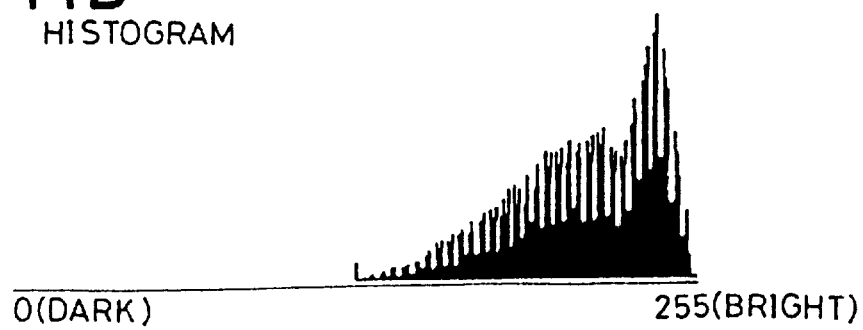

FIG. 14 shows a luminance distribution of the original image 51 and the adjusted image 52 when the mouse pointer 503 of the luminance of (1) is moved. FIG. 14(a) corresponds with the luminance distributions of the original image 51, FIG. 14(b) corresponds with that of the adjusted image 52. Generally, it is well known that a color is expressed by using the luminance, chroma, hue. FIG. 14 shows a graph of the luminance. The horizontal axis stands for the luminance. It is defined that the value 0 stands for a dark color, the value 255 for a bright color. The vertical axis stands for a frequency of corresponding data with an optional scale. In this case, the mouse pointer 503 is moved to decrease the luminance, which can be known easily from the fact that the graph extends to the left. The other distributions of the chroma and the hue change hardly. Thus, it is possible to adjust the amount for the luminance of the color by the process (1) (step S52).

Figure 15A:
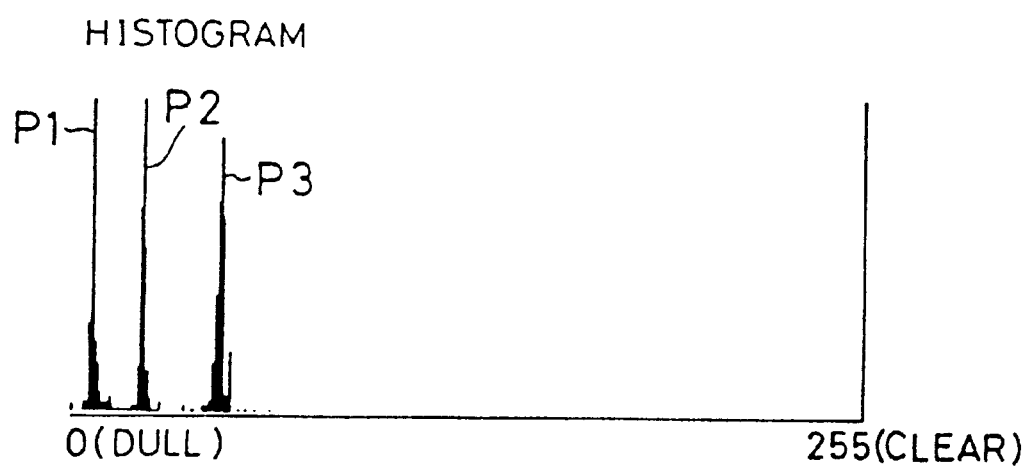
FIGS. 15A–15B (also referred to collectively as FIG. 15 and described herein as FIGS. 15(a)–15(b)) show a second result of the experiment of the color adjusting according to the first embodiment of the present invention.
Figure 15B:
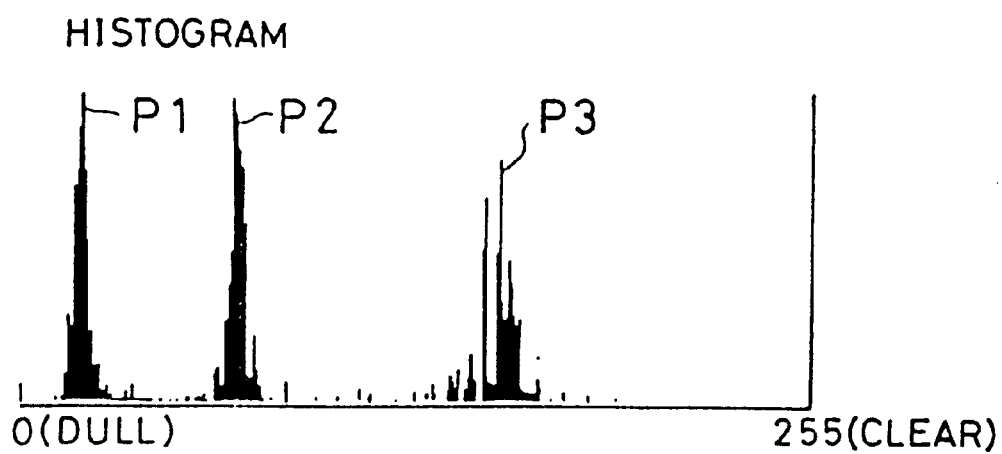

FIG. 15 shows a chroma distribution of the original image 51 and the adjusted image 52 when the mouse pointer 503 of the chroma is moved as described in process (2). FIG. 15(a) corresponds with the chroma distribution of the original image 51, FIG. 15(b) corresponds with that of the adjusted image 52. The horizontal axis of the graph stands for the chroma. It is defined that the value 0 corresponds with a dull color, the value 255 with a clear color. The vertical axis stands for the frequency of the corresponding data with an optional scale. In this case, the mouse pointer 503 is moved to increase the chroma, which can be known from the graph. The clearest color of the original image 51, whose value is 255 in the graph, is adjusted to be the same value in the adjusted image 52 because there is no more clear color value than 255 in the adjusted image 52. The other distributions of the luminance and the hue change hardly. Thus, it is possible to adjust the amount of the chroma of the color by the process (2).

Figure 16A:
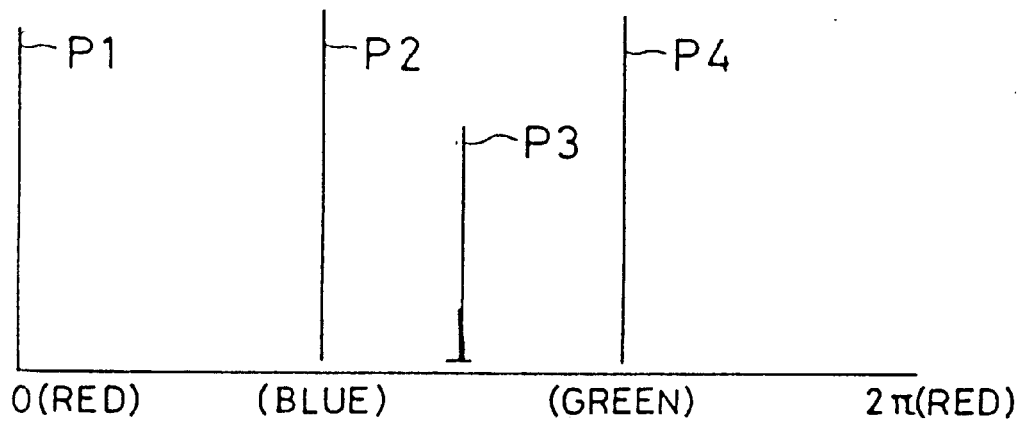
FIGS. 16A–16B (also referred to collectively as FIG. 16 and described herein as FIGS. 16(a)–16(b)) show a third result of the experiment of the color adjusting according to the first embodiment of the present invention.
Figure 16B:
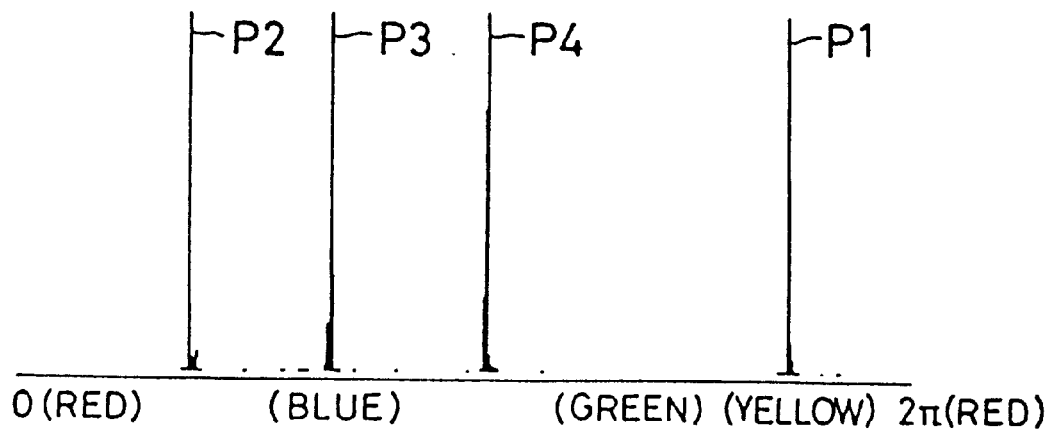

FIG. 16 shows a hue distribution of the original image 51 and the adjusted image 52 when the mouse pointer 503 of the hue is moved as described in process (3). FIG. 16(a) corresponds with the hue distribution of the original image 51, FIG. 16(b) with the hue distribution of the adjusted image 52. The horizontal axis of the graph stands for the hue. 0 corresponds with red, $(2/3)\pi$ with blue, $(4/3)\pi$ with green. Since the hue circulates, it returns to the red again by $2\pi$. The vertical axis stands for the frequency of the corresponding data with an optional scale. In this case, the mouse pointer 503 is moved to change the hue in the direction of the minus, namely it means that the blue nears the red, which can be known from the graph.

Since the color circulates, the red of the original image 51 (value 0, P1 in FIG. 16) is adjusted to be a color between the green and the red, that is yellow, in the adjusted image 52. Other distributions of the luminance and chroma change hardly. Thus, it is possible to adjust the amount of the hue by the process (3).

Since color information is displayed with a graph using corresponding colors, users can adjust the color easily in this embodiment. In addition, since the original image, the adjusted image, information of the original image and information of the adjusted image are displayed simultaneously, it is possible to compare the images in adjusting. In this embodiment, by using a color adjustment matrix, it is possible to adjust the image without converting the color space of the image data into the color space for indicating the adjustment, even when the two color spaces are different.

As stated above, the color information corresponds with the image definitely in this embodiment, so that the operation of the color adjustment direction is improved. In addition, it is possible to adjust the color without converting the color space of the image data by using the color adjustment matrix even when the adjustment amount is specified at the color space differing from the color space of the image data.

Embodiment 2.

Figure 17:
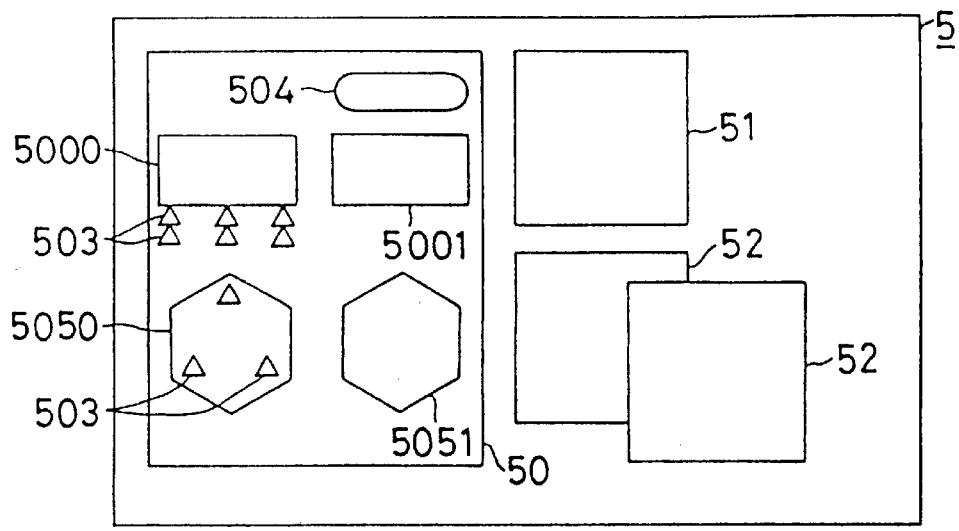
FIG. 17 shows an image display unit according to a second embodiment of the present invention.

A second embodiment of the present invention will be explained with reference to FIG. 17. FIG. 17 shows a detailed drawing of the image display unit 5. A chroma & hue information graph 5050 of the original image 51, a chroma & hue information graph 5051 of the adjusted image 52 are shown in FIG. 17. Since the other signs in FIG. 17 are corresponding to those of FIG. 2, explanation about them is omitted.

As operation of this embodiment is similar to that of FIG. 3, explanation about it is also omitted. Color information of the original image 51 is displayed in a luminance information graph 5000 and the chroma & hue information graph 5050. Color information of the adjusted image 52 is displayed in a luminance information graph 5001 and the chroma & hue information graph 5051.

Figure 18A:
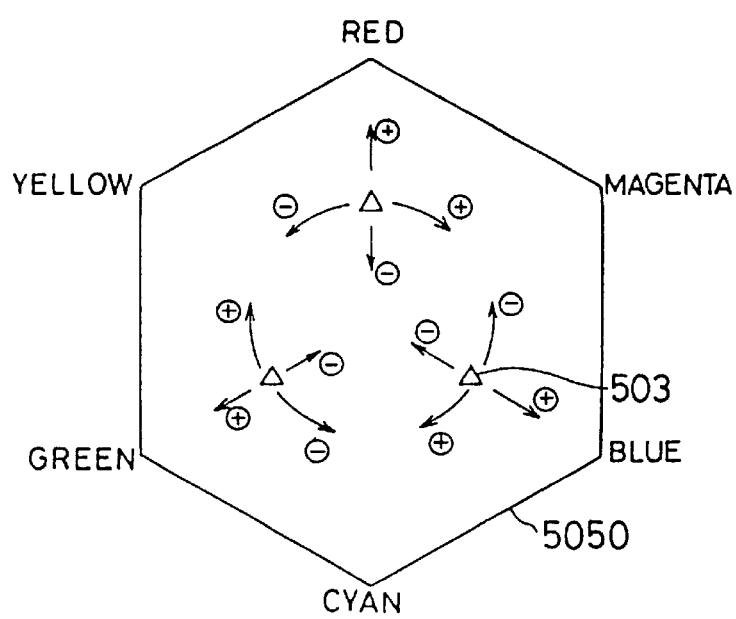
FIGS. 18A–18B (also referred to collectively as FIG. 18 and described herein as FIGS. 18(a)–18(b)) show a color information display area and illustrate operation of it, according to the second embodiment of the present invention.
Figure 18B:
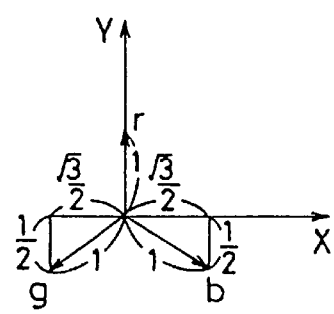

The display of the chroma & hue information graph 5050, and operation of the mouse pointers 503 will be explained with reference to FIG. 18. FIG. 18 shows the chroma & hue information graph 5050. It is defined that the right horizontal direction is x, the up vertical direction is y and the center of the hexagonal graph is the origin of the xy coordinates. A display of the chroma & hue information graph of image signal (r, g, b) is as follows. The display position is expressed with the following point (x, y).

$x=(\sqrt{3})\times(b-g)/2$ $y=r-(b+g)/2$

The display color is expressed in three components of the image signal (r, g, b) with assuming that the minimum value of the three components is "min".

color=(r−min, g−min, b−min)

By displaying as the above, distribution of the chroma and distribution of the hue can be displayed simultaneously. The display of the chroma & hue information graph 5051 for the adjusted image is the same as for the original image.

Now operation of the mouse pointers 503 on the chroma & hue information graph 5050 for the original image 51 will be described. There are three mouse pointers 503 on the chroma & hue information graph and each of the mouse pointers corresponds with each component of the image signal. The mouse pointers are movable in the direction of the center (or away from the center) and in the direction of plus (or minus) along the circumference. The movement amount in the direction of the center (or away from the center) indicates the changed amount of the chroma, $\Delta cr$, $\Delta cg$, and $\Delta cb$. The movement amount in the direction of plus (or minus) along the circumference indicates the changed amount of the hue, $\Delta hr$, $\Delta hg$, and $\Delta hb$. Every mouse pointer 503 can move in the direction of plus and minus. By displaying the chroma information and the hue information on the same graph, the number of mouse pointers can be reduced as compared to embodiment 1. In addition, it is possible to direct the changed amount of the chroma and hue simultaneously by moving the mouse pointer 503 on a two dimensional level.

An effect similar to that of the first embodiment can be obtained by providing the image display unit 5 which has the above construction. Embodiment 3.

In the first and second embodiments, the image signals are expressed in rgb, cmy, or XYZ. Wvhen the image signals are expressed in CIELAB and CIELUV provided by JIS (Japanese Industrial Standard), operation of the color adjusting unit 2 is changed. The flow of the operation of the color adjusting unit 2 becomes similar to the flow of FIG. 9. In this case, the methods of setting up the matrix of steps S25 to S27 are as follows.

Process (1): The case of the mouse pointers 503a and 503b of the luminance being moved—Step S25

Since the luminance, chroma and hue are separated entirely in CIELAB and CIELUV, the set up matrix N is different from the one in the first and second embodiments. The maximum luminance sent from the image display unit 5 is defined to be Lmax and the minimum luminance from it is defined to be Lmin. The maximum luminance for adjusting is defined to be AL max and the minimum luminance for adjusting is to be AL min, the set up matrix N is as follows.

$$N = \begin{bmatrix} \frac{ALmax - ALmin}{Lmax - Lmin} & 0 & 0 \\ M21 & M22 & M23 \\ M31 & M32 & M33 \end{bmatrix} \quad \text{[Formula 15]}$$

The matrix J is as follows.

$$J = \begin{bmatrix} -\frac{ALmax - ALmin}{Lmax - Lmin} \\ 0 \\ 0 \end{bmatrix} \quad \text{[Formula 16]}$$

Process (2): The case of the mouse pointer 503c of the chroma being moved—Step S26

Assuming that changed amount of the chroma is $\Delta C1$ and $\Delta C2$, the set up matrix N is as follows.

$$N = \begin{bmatrix} M11 & M12 & M13 \\ 0 & M22 + \Delta C1 & M23 \\ 0 & M32 & M33 + \Delta C2 \end{bmatrix} \quad \text{[Formula 17]}$$

Process (3): The case of the mouse pointer 503d of the hue being moved—Step S27

Assuming that changed amount of the hue is $\Delta H1$ and $\Delta H2$, the set up matrix N is as follows.

$$N = \begin{bmatrix} M11 & M12 & M13 \\ 0 & M22 & M23 + \Delta H2 \\ 0 & M32 + \Delta H1 & M33 \end{bmatrix} \quad \text{[Formula 18]}$$

When the image signals are expressed in CIELAB and CIELUV, an effect similar to that of the above embodiment can be obtained by producing a different type of set up matrix.

Embodiment 4.

A fourth embodiment of the present invention will be explained with reference to FIG. 19. FIG. 19 is a flowchart showing operation of the color adjusting unit 2 of this embodiment. Matrix store process is performed at step S31 in FIG. 19. Since the other signs are corresponding to those of FIG. 9, explanation about them is omitted.

Now, operation will be explained. When the end switch 504 is turned on, the matrix store process at step S31 is performed. That is a process of storing the set up matrix in the storage 6. After this process, the operation of the color adjusting unit 2 comes to the "END" at step S30. Because of the matrix store process, adjusting operation can be omitted the next time. Namely, by using this stored matrix for the next adjustment, the adjusting processes described in the first embodiment can be omitted, which is more efficient.

Embodiment 5.

Figure 20:
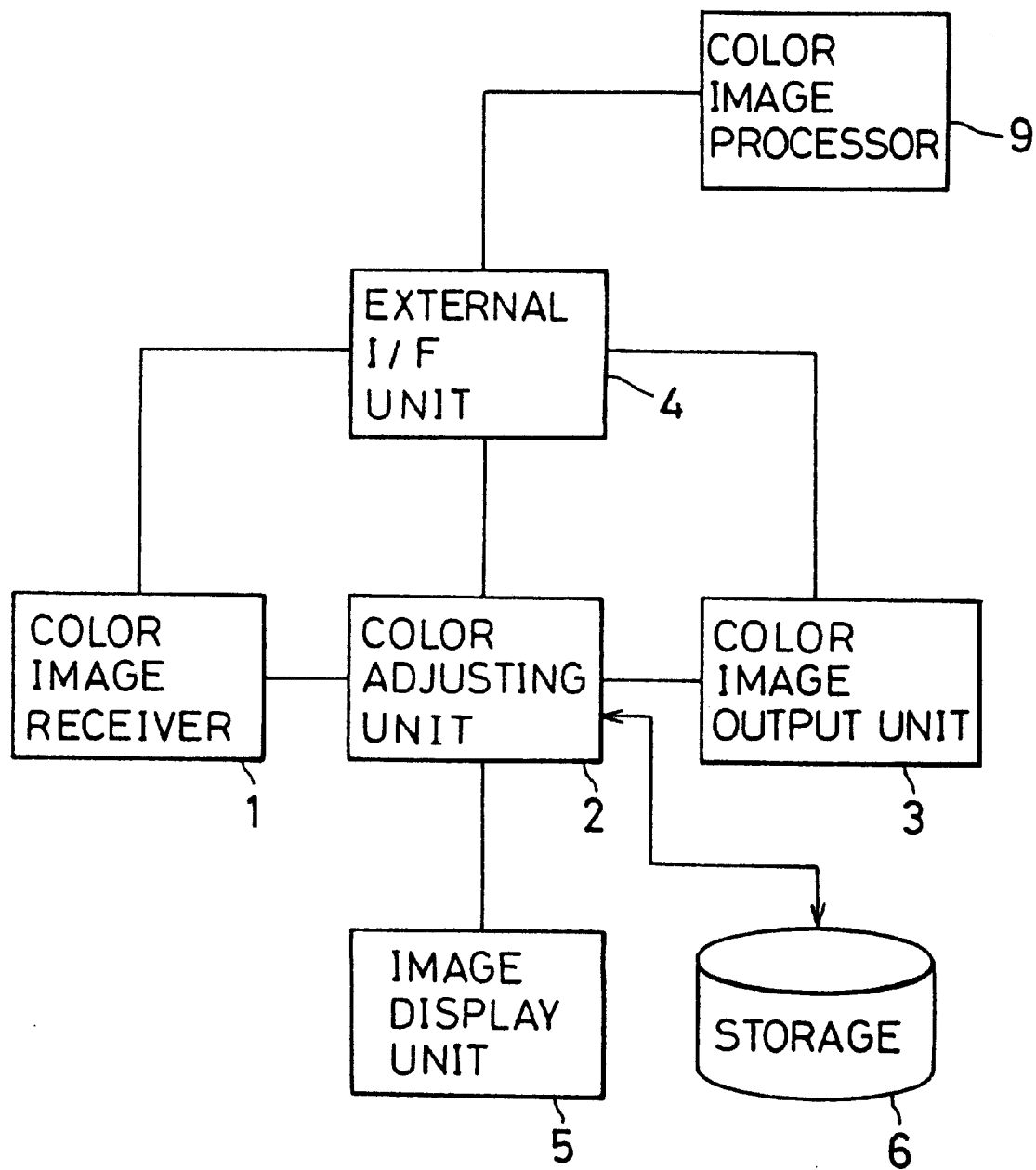
FIG. 20 shows a configuration of a color image system according to a fifth embodiment of the present invention.

A fifth embodiment will be explained with reference to FIG. 20. A color image processor 9 is an external device which can send and receive a color adjustment matrix. The external color image processor 9 means a display, printer, copy machine, scanner and such, concretely. Since the other elements in FIG. 20 are corresponding to those of FIG. 1, explanation about them is omitted.

The external color image processor 9 is connected with the external interface unit 4. The color adjustment matrix is sent and received between the external color image processor 9 and the external interface unit 4.

Figure 21:
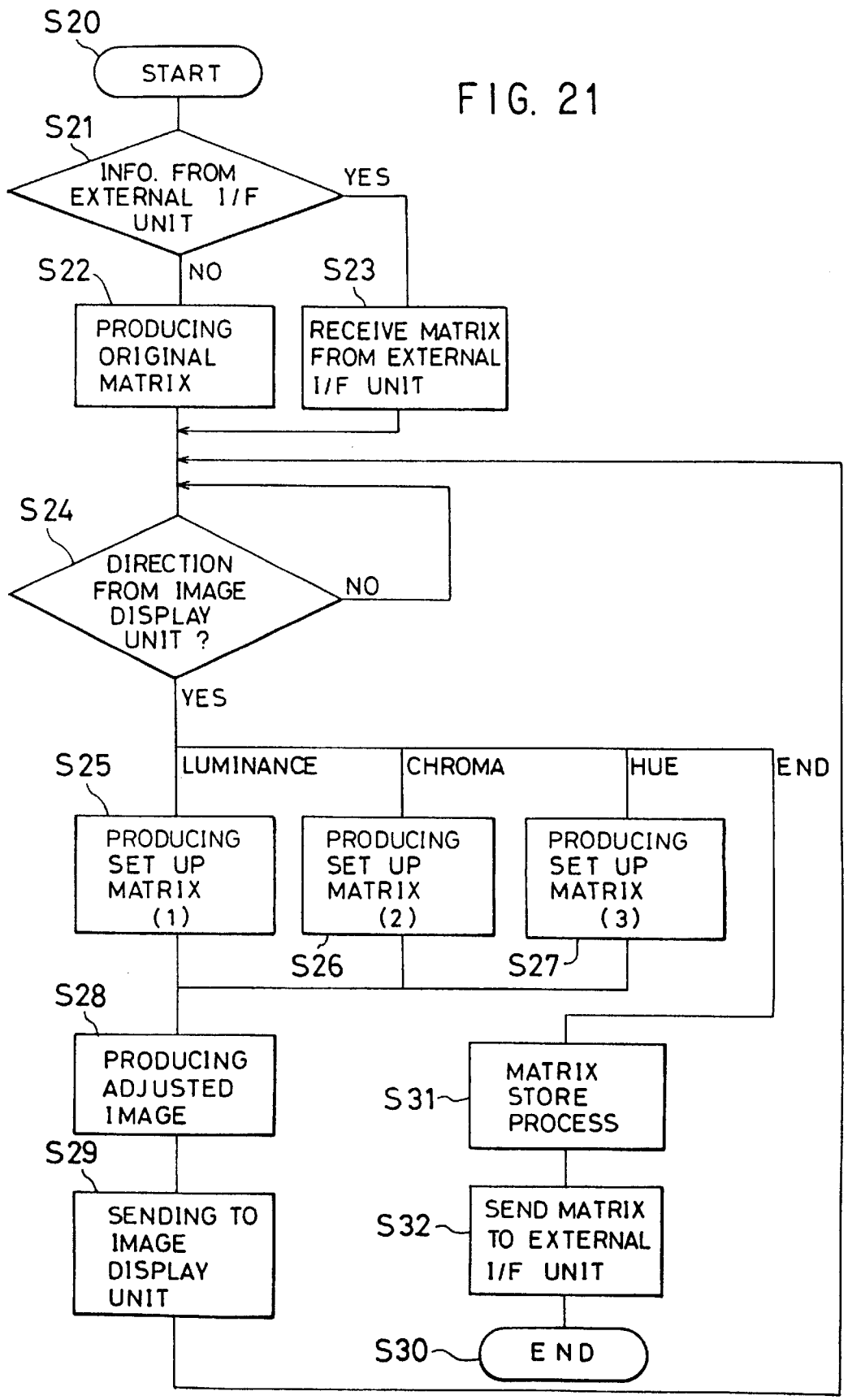
FIG. 21 illustrates operation of a color information display unit according to a fifth embodiment of the present invention.

Operation of the fifth embodiment will be explained with respect to the operation of the color adjusting unit 2. FIG. 21 is a flowchart showing the operation of the color adjusting unit 2. The color adjusting unit 2 starts from "START" at step S20. Information from the external interface unit 4 is received and whether or not the external color image processor 9 is connected, is judged at step S21.

When the external color image processor 9 is not connected, the flow goes to "PRODUCING ORIGINAL MATRIX" at step S22. The following matrix is produced as the original matrix, for example.

$$\begin{bmatrix} M11 & M12 & M13 \\ M21 & M22 & M23 \\ M31 & M32 & M33 \end{bmatrix} = \begin{bmatrix} 1 & 0 & 0 \\ 0 & 1 & 0 \\ 0 & 0 & 1 \end{bmatrix} \quad \text{[Formula 19]}$$

When the external color image processor 9 is connected, the flow goes to "RECEIVE MATRIX FROM EXTERNAL I/F UNIT" at step S23. The external interface unit 4 receives a matrix used in the external color image processor 9, such as scanner, printer, display, and sends the matrix to the color image receiver 1. This received matrix is described as follows.

$$\begin{bmatrix} M11 & M12 & M13 \\ M21 & M22 & M23 \\ M31 & M32 & M33 \end{bmatrix} = \begin{bmatrix} U11 & U12 & U13 \\ U21 & U22 & U23 \\ U31 & U32 & U33 \end{bmatrix} \quad \text{[Formula 20]}$$

A direction from the image display unit 5 is watched at step S24. Step S24 loops and no process is performed until the direction comes. The process is separated into four cases depending upon a direction when the direction from the image display unit 5 comes.

Process (1): The case of the mouse pointers 503a and 503b of the luminance being moved Process (2): The case of the mouse pointer 503c of the chroma being moved Process (3): The case of the mouse pointer 503d of the hue being moved Process (4): The case of the END switch 504 being turned on Since Processes (1), (2) and (3) at steps S25, S26 and S27 are the same as the processes described in Embodiment 1 and Embodiment 2, explanation about them is omitted.

Process (4): The case of the END switch 504 being turned on

When the END switch 504 is turned on, the matrix store process at step S31 is performed. Set up matrix is stored in the storage 6. Because of this storing, the adjusting operation can be omitted the next time by using this stored matrix. Then, the flow goes to "SEND MATRIX TO EXTERNAL I/F UNIT" at step S32. When the external color image processor 9 is connected, the process of sending the set up matrix to the external color image processor 9 is performed at step S32. By this process, it is possible to change the matrix for a color correction process inside the external color image processor 9. After these processes, the operation of the color adjusting unit 2 comes to "END" at step S30.

On account of the above configuration, the color image system can be used as a color adjusting unit of the external color image processor 9.

Embodiment 6.

Although the color information display area 50, the original image 51 and the adjusted image 52 of the image display unit 5 are displayed on the same display screen in the above embodiments, it is not always necessary to be on the same display screen. The color information display area 50 can be displayed at a display unit (not shown), the original image 51 and the adjusted image 52 can be printed out to a printer (not shown), for instance.

Embodiment 7.

Although the method of displaying the color information display area 50, the original image 51 and the adjusted image 52 in the image display unit 5 is described in the above embodiments, it is acceptable that the color image system doesn't display any information as the above but performs the color adjusting by just giving an adjustment direction wherein the amount of the color adjustment corresponds to the distribution of the color information definitely, through a keyboard and such.

Embodiment 8.

Although the chroma & hue information graphs 5050 and 5051 are displayed in a hexagon, it is acceptable to display them in a circle. In this case, the image signals are transformed into the luminance, chroma, hue, and then the chroma is displayed as a radius vector, the hue as an inclination.

The color image system according to above embodiments has effects that the direction of the color adjustment, the color information graph and the adjusted image corresponds one another definitely, so that the operation efficiency of the color adjustment direction is improved, the color adjustment is performed by the user simply, and the color for the external color image processor can be adjusted easily.

What is claimed is:

1. A color image system for adjusting a color of an original image to obtain an adjusted image, comprising:
    (a) image display means for displaying the original image and the adjusted image;
    (b) color information display means for analyzing the original image to produce first color information representing at least one color characteristic of the original image and displaying the first color information, and for analyzing the adjusted image to produce second color information and displaying the second color information;
    (c) adjustment control display means for displaying with display of the first color information a representation of an adjustment to the at least one color characteristic of the original image and providing a direction of a color adjustment with reference to the color information displayed by the color information display means; and
    (d) adjustment means for producing the adjusted image based on the adjustment to the at least one color characteristic represented by said adjustment control display means.

2. The color image system of claim 1, wherein the adjustment control display means displays a movable pointer along with the first color information and identifies an adjustment amount according to a position of the movable pointer, and wherein the adjustment means determines the amount of the adjustment based on the position of the movable pointer.

3. A color image adjusting method for adjusting a color image using an original image and an adjusted image, comprising the steps of:
    (a) displaying the original image on an image display unit;
    (b) analyzing the original image to produce first color information representing at least one color characteristic of the original image and displaying the first color information on the image display unit;
    (c) displaying with display of the first color information a representation of an adjustment to the at least one color characteristic of the original image;
    (d) producing the adjusted image based on the adjustment to the at least one color characteristic and displaying the adjusted image on the image display unit; and
    (e) analyzing the adjusted image to produce second color information representing at least one color characteristic of the adjusted image and displaying the second color information on the image display unit.

4. The color image displaying method of claim 3, further comprising the step of repeating the adjusting step and the producing step so as to get a desired adjusted image.

5. The color image system of claim 3, wherein the representing step includes the steps of displaying a movable pointer along with the first color information and identifying an adjustment amount according to a position of the movable pointer, and wherein the producing step includes the step of determining the amount of the adjustment based on the position of the movable pointer.

6. A color image adjusting method in a color image system in which an original image and an adjusted image are expressed by coordinates data subject to a first color space, comprising the steps of:
    (a) converting coordinates data subject to the first color space to coordinates data subject to a second color space;
    (b) producing color information based on the converted coordinates data;
    (c) displaying the produced color information;
    (d) representing an adjustment amount of a color characteristic with the coordinates data subject to the second color space relative to, and on the display of, the displayed color information;
    (e) producing a color adjustment matrix based on the adjustment amount; and
    (f) producing the adjusted image based on the produced color adjustment matrix.

7. The color image adjusting method of claim 6, wherein the adjusted image producing step comprises the step of performing a matrix calculation of the color adjustment matrix and coordinates data of the original image so as to convert the original image to the adjusted image directly.

8. The color image adjusting method of claim 3, wherein the color information displaying step comprises the step of simultaneously displaying distribution maps of luminance, chroma and hue.

9. The color image adjusting method of claim 8, wherein the color information displaying step includes the step of displaying a distribution map which combines at least two of the distribution maps of luminance, chroma and hue in one display area.

10. A color image system which adjusts the color of an original image and produces an adjusted image, comprising:
   image display means for displaying the original image and the adjusted image simultaneously;
   color information display means for producing first color information representing at least one color characteristic of the original image and second color information representing at least one color characteristic of the adjusted image and displaying the first and second color information;
   adjustment control display means for receiving and displaying an amount of a color adjustment of the at least one color characteristic relative to the display of the first color information; and
   matrix production means for producing a color adjustment matrix based on the amount of the color adjustment.

11. The color image system of claim 10 further comprising means for storing the color adjustment matrix.

12. The color image system of claim 10 further comprising means for sending and receiving the color adjustment matrix.

13. The color image system of claim 10, wherein the color information display means displays the color information as a color components distribution.

14. The color image system of claim 13, wherein the color components distribution is one of a luminance distribution, a hue distribution, a chroma distribution and a hue-chroma simultaneous distribution.

15. The color image system of claim 14, wherein the color information display means displays the color components distribution with color corresponding to the color information.

16. The color image system of claim 14, wherein the adjustment control display means includes a movable pointer displayed adjacent the first color information, and wherein an amount by which the pointer is moved indicates the adjustment amount.

17. The color image system of claim 10, wherein the matrix production means changes the color adjustment matrix depending upon each adjustment amount of the luminance, hue and chroma.

18. The color image system of claim 10, wherein the color information display means uses one of color spaces of the CIERGB, CIEXYZ, CIELAB and CIELUV for the color information.

19. The color image adjusting method of claim 6, wherein the color information displaying step comprises the step of simultaneously displaying distribution maps of luminance, chroma and hue.

20. The color image adjusting method of claim 19, wherein the color information displaying step includes the step of displaying a distribution map which combines at least two of the distribution maps of luminance, chroma and hue in one display area.

21. A color image system for adjusting color of an original image, comprising:
   image display means, receiving data representing said original image, for displaying said original image;
   color information display means for displaying color information relating to at least one color characteristic of said original image;
   adjustment input means for inputting a color adjustment instruction for adjusting the at least one color characteristic of said original image;
   adjustment display means for displaying said color adjustment instruction relative to said displayed color information; and
   adjusting means for adjusting the color of said original image in response to said color adjustment instruction to produce an adjusted image.

22. The color image system of claim 21, wherein said color information display means also displays second color information relating to at least one color characteristic of said adjusted image.

23. The color image system of claim 21, wherein said image display means also displays said adjusted image.

24. The color image system of claim 21, wherein said adjusting means includes matrix means for producing an adjustment matrix corresponding to said color adjustment instruction.

25. The color image system of claim 24, wherein said adjustment input means includes means for inputting a plurality of color adjustment instructions, and wherein said matrix means revises said adjustment matrix after each of said adjustment instructions.

26. The color image system of claim 21, wherein said color adjustment instruction includes a change to at least one of luminance, chroma and hue.

27. A method for operating a color image system, comprising the steps of:
   displaying an original image;
   displaying color information representing at least one color characteristic obtained from an analysis of said original image;
   receiving a color adjustment instruction for adjusting the at least one color characteristic;
   displaying said color adjustment instruction relative to the displayed color information; and
   producing an adjusted image in response to said color adjustment instruction.

28. The method of claim 27, wherein said producing step includes the steps of:
   producing a color adjustment matrix corresponding to said color adjustment instruction; and
   applying said color adjustment matrix to data representing said original image to produce said adjusted image.

29. The method of claim 28, wherein said color adjustment instruction Identifies a change in at least one of luminance, chroma and hue.

30. The method of claim 27, wherein said color adjustment instruction corresponds to said displayed color information.

31. The method of claim 27, further comprising the step of displaying said adjusted image.

* * * * *